United States Patent
Sane

(10) Patent No.: US 10,819,567 B2
(45) Date of Patent: Oct. 27, 2020

(54) DATACENTER CABLING SERVICING SYSTEM

(71) Applicant: Dell Products L.P., Round Rock, TX (US)

(72) Inventor: Sanjay Sane, Fremont, CA (US)

(73) Assignee: Dell Products L.P., Round Rock, TX (US)

( * ) Notice: Subject to any disclaimer, the term of this patent is extended or adjusted under 35 U.S.C. 154(b) by 211 days.

(21) Appl. No.: 15/015,939

(22) Filed: Feb. 4, 2016

(65) Prior Publication Data

US 2017/0230233 A1    Aug. 10, 2017

(51) Int. Cl.
H04L 12/24    (2006.01)

(52) U.S. Cl.
CPC .......... *H04L 41/0677* (2013.01); *H04L 41/12* (2013.01)

(58) Field of Classification Search
CPC ..... H04L 41/0677; H04L 41/12; H04L 67/36; H04L 41/0672; H04L 41/22; H04L 41/5032; H04L 41/0806; H04L 41/0813; H04L 2209/80; H04L 41/0604; H04L 41/5009; H04L 47/822; H04L 67/1008; G06Q 10/06; G06Q 10/0633; G06Q 10/20; H04W 48/10; H04W 4/043; H04W 4/80; H04W 64/003

See application file for complete search history.

(56) References Cited

U.S. PATENT DOCUMENTS

| | | | | |
|---|---|---|---|---|
| 8,803,660 B2* | 8/2014 | Martin | ................... | G08C 21/00 340/10.1 |
| 2002/0095487 A1* | 7/2002 | Day | ....................... | H04L 29/06 709/223 |
| 2003/0046339 A1* | 3/2003 | Ip | ........................... | H04L 41/12 709/203 |
| 2005/0196124 A1* | 9/2005 | Aldereguia | ......... | G06F 13/4265 385/147 |
| 2010/0153165 A1* | 6/2010 | Kosseifi | .......... | G06Q 10/06311 705/7.13 |
| 2011/0043371 A1* | 2/2011 | German | ................. | H04Q 1/136 340/815.45 |
| 2011/0218730 A1* | 9/2011 | Rider | ..................... | G01C 21/00 701/533 |

(Continued)

*Primary Examiner* — Jason D Recek
*Assistant Examiner* — Ranjan Pant
(74) *Attorney, Agent, or Firm* — Haynes and Boone, LLP

(57) ABSTRACT

A datacenter cabling issue addressing system includes computing devices interconnected by cabling subsystems. Cabling locator devices are associated with each of the cabling subsystems. A cabling management system receives cabling issue identification information through a network that identifies a cabling issue with a first cabling subsystem. A cabling issue location of the first cabling subsystem is determined using the cabling issue identification information and a first cabling locator device location received through the network from a first cabling locator device that is associated with the first cabling subsystem. A current location is received through the network from each of the cabling servicing devices and, in response, a first cabling servicing device is determined to include a current location that is closest to the cabling issue location. The cabling issue location of the first cabling subsystem is then provided through the network for display on the first cabling servicing device.

18 Claims, 12 Drawing Sheets

(56) References Cited

U.S. PATENT DOCUMENTS

| | | | |
|---|---|---|---|
| 2011/0241833 A1* | 10/2011 | Martin | G08C 21/00 340/10.1 |
| 2012/0092811 A1* | 4/2012 | Chapel | H04L 12/10 361/622 |
| 2013/0084972 A1* | 4/2013 | Frady | G07F 17/3232 463/29 |
| 2013/0103973 A1* | 4/2013 | Werth | G06F 9/5072 714/2 |
| 2014/0208214 A1* | 7/2014 | Stern | H04L 41/22 715/734 |
| 2014/0253289 A1* | 9/2014 | Groth | H05K 7/1498 340/8.1 |
| 2015/0122047 A1* | 5/2015 | Riddall | G01L 5/103 73/828 |
| 2015/0356041 A1* | 12/2015 | Barnur | G06F 13/4022 710/104 |
| 2016/0026837 A1* | 1/2016 | Good | G16Z 99/00 340/539.13 |
| 2016/0241996 A1* | 8/2016 | Bourque | H04W 4/021 |
| 2017/0213057 A1* | 7/2017 | Primm | H05K 7/1498 |

* cited by examiner

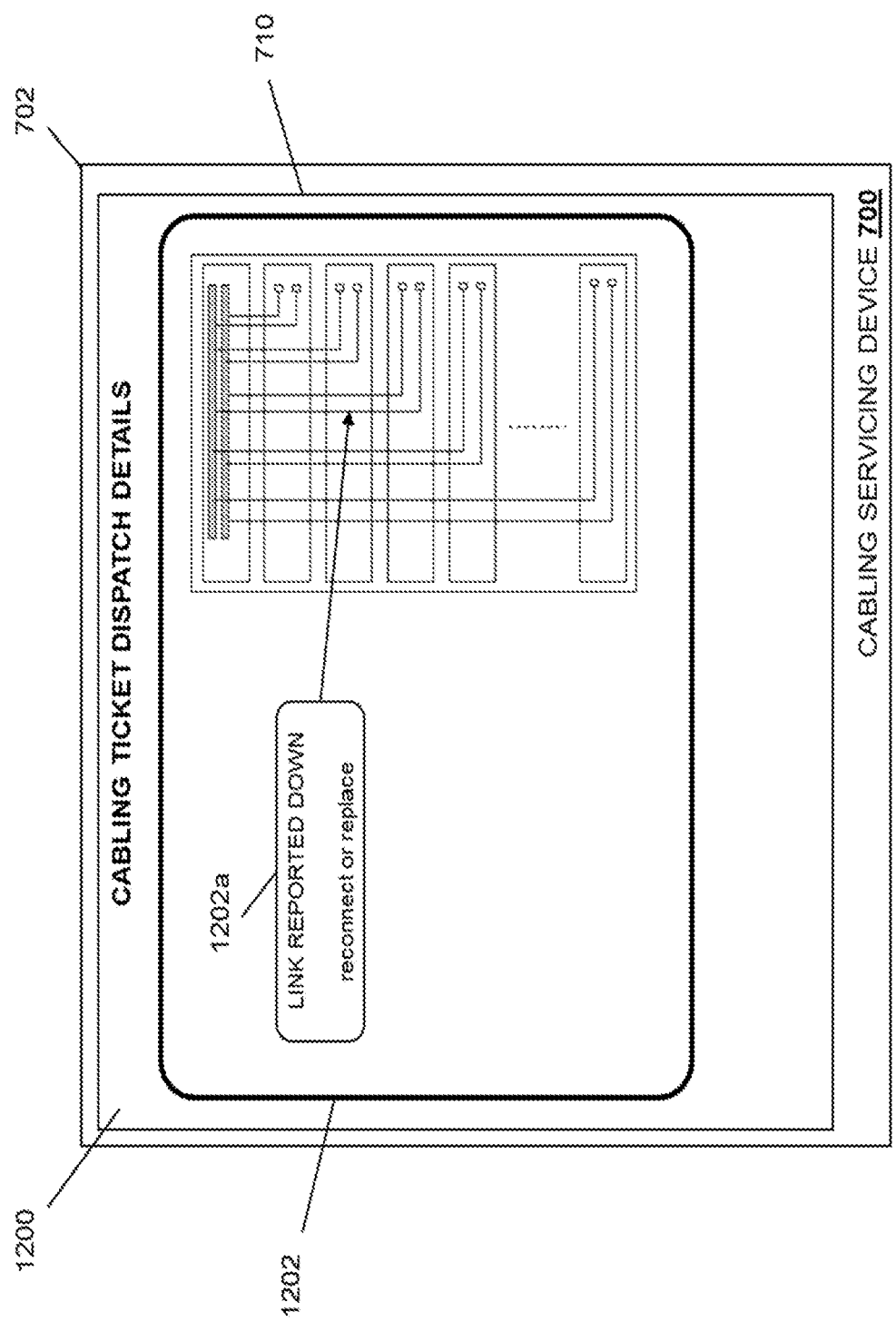

DATACENTER CABLING SERVICING SYSTEM

BACKGROUND

The present disclosure relates generally to information handling systems, and more particularly to a system for servicing cabling used to connect information handling systems in a datacenter.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems included in datacenters are coupled together via cabling to provide datacenter networks. Such cabling, and particularly the provisioning, upkeep, and servicing of that cabling, is a major source of operational expenditures in a datacenter, while the mean time to repair (MTTR) issues in the datacenter is taken up primarily due to cabling troubleshooting and re-cabling activities. While cabling servicing systems have been introduced that operate to detect existing cabling issues, cabling technicians are still required to manually address those existing cabling issues, including providing cabling for newly-added or to-be-modified systems in the datacenter. The addressing of the cabling issues is conventionally performed by the cabling technician guided by a hard-copy (e.g., paper) map of the datacenter, and utilizing labels on the rows, aisles, and/or racks of the datacenter to navigate to the location of the cabling issues. As such, cabling servicing in a datacenter is a manual and relatively time-consuming and error-prone process.

Accordingly, it would be desirable to provide an improved cabling servicing system.

SUMMARY

According to one embodiment, an information handling system (IHS) includes a communication system; a processing system; and a memory system that is coupled to the processing system and that includes instructions that, when executed by the processing system, cause the processing system to provide a cabling management engine that is configured to: receive cabling issue identification information through the communication system from a cabling issue system, wherein the cabling issue identification information identifies a cabling issue with a first cabling subsystem of a plurality of cabling subsystems in a datacenter; determine a cabling issue location of the first cabling subsystem using the cabling issue identification information and a first cabling locator device location received through the communication system from a first cabling locator device, of a plurality of cabling locator devices in the datacenter, that is associated with the first cabling subsystem; receive a current location through the communication system from each of a plurality of cabling servicing devices and, in response, determine a first cabling servicing device of the plurality of cabling servicing devices that includes a current location that is closest to the cabling issue location; and provide the cabling issue location of the first cabling subsystem through the communication system for display on the first cabling servicing device.

BRIEF DESCRIPTION OF THE DRAWINGS

FIG. 12 is a schematic view illustrating the cabling servicing device of FIG. 7 providing cabling issue details.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
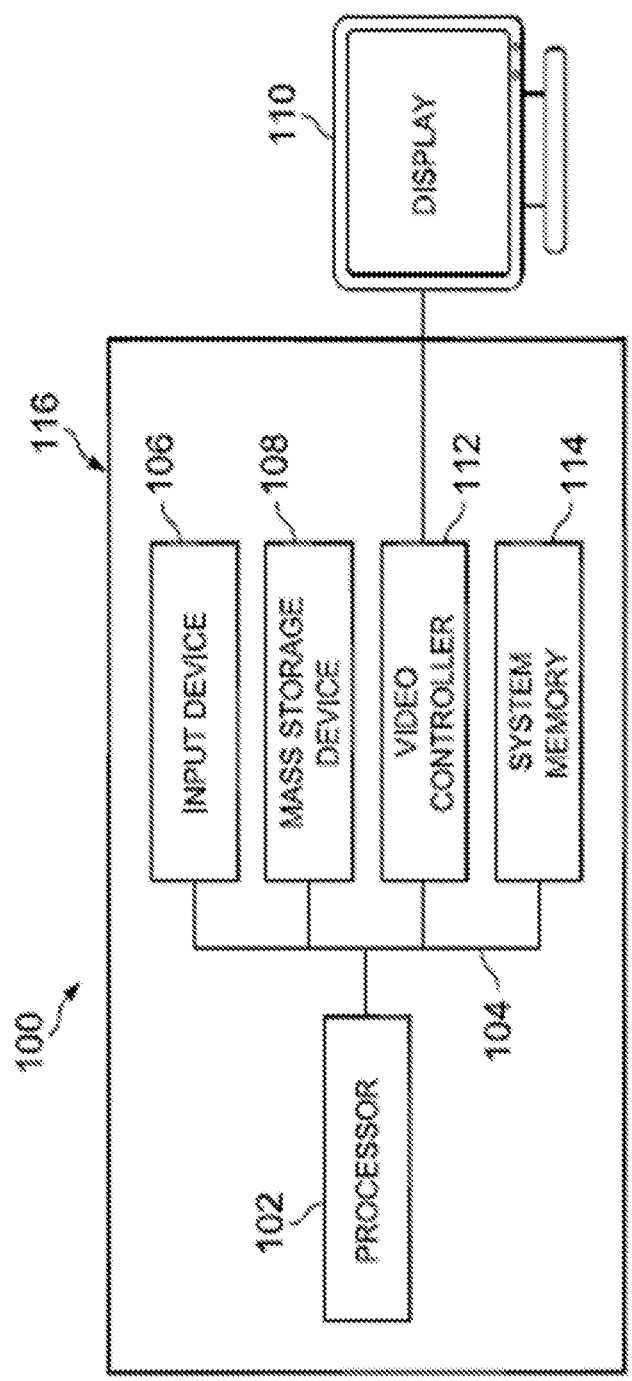
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
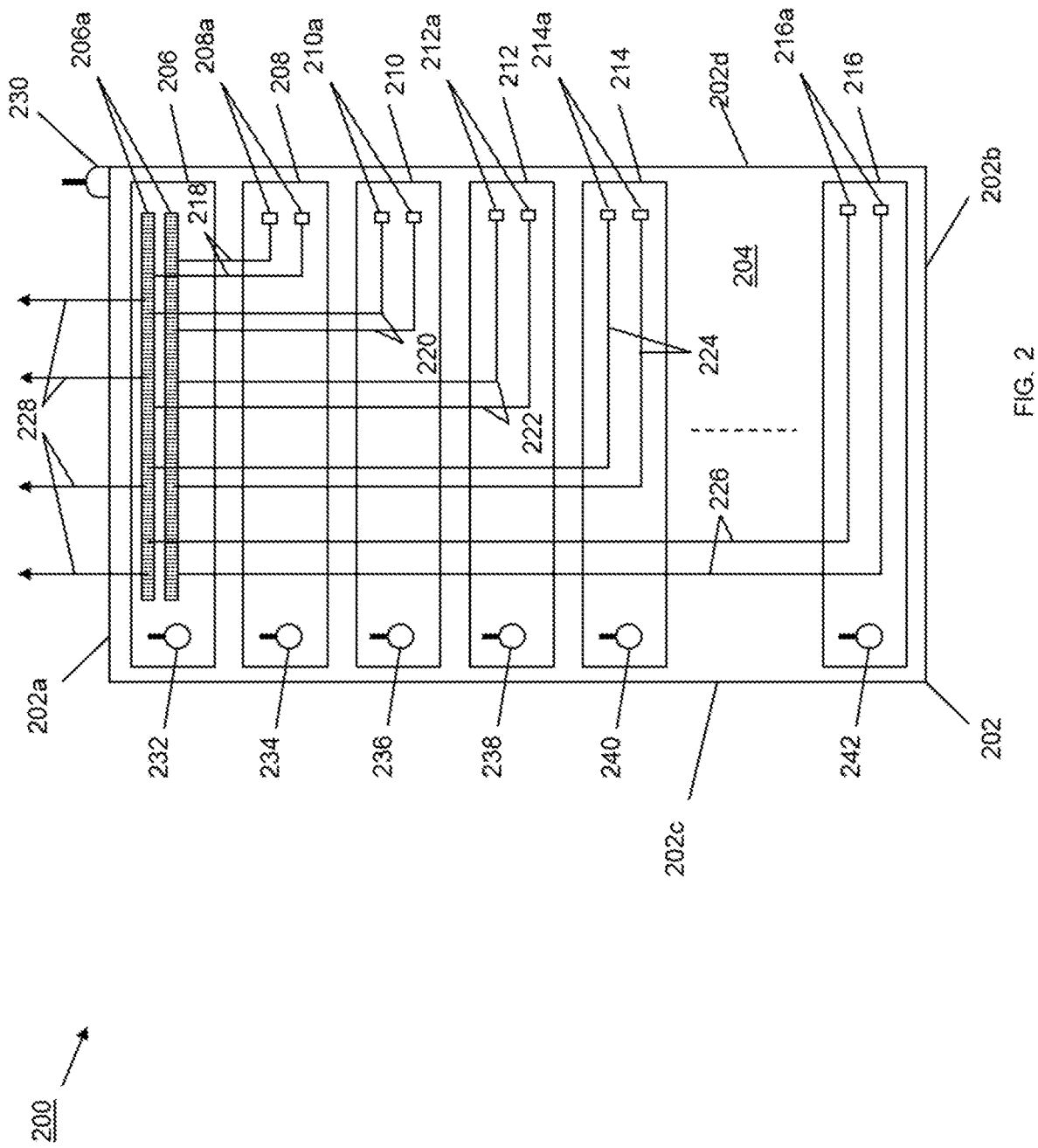
FIG. 2 is a schematic view illustrating an embodiment of a datacenter rack including a plurality of computing devices.

Referring now to FIG. 2, an embodiment of a datacenter rack 200 is illustrated. The rack includes a chassis 202 that includes a top wall 202a, a bottom wall 202b that is located opposite the chassis 202 from the top wall 202a, and a pair of side walls 202c and 202d that are located opposite the chassis 202 from each other and that extend between the top wall 202a and the bottom wall 202b. While not illustrated, the chassis 202 may include a front wall that extends between the top wall 202a, the bottom wall 202b, and the side walls 202c and 202d, and/or a rear wall that that may be located opposite the chassis 202 from the front wall and that extends between the top wall 202a, the bottom wall 202b, and the side walls 202c and 202d. Furthermore, while also not illustrated, the chassis 202 may include features for coupling computing devices to the chassis 202 (e.g., on the side walls 202c and 202d), routing cabling, access computing devices housed within the chassis 202, providing for airflow through the chassis 202, and/or any other rack feature known in the art. A computing device housing 204 is defined by the chassis 202 between the top wall 202a, the bottom wall 202b, and the side walls 202c and 202d, and define a plurality of chassis slots that are configured to house computing devices. While a specific example of a rack is illustrated and described below, one of skill in the art will recognize that the teachings of the present disclosure will be beneficial to systems including a variety of racks and/or other computing device housings known in the art, and thus systems including those computing device housings will fall within the scope of the present disclosure as well.

A plurality of computing devices are housed in the chassis 202 including, in the illustrated embodiment, a networking device 206 and a plurality of server devices 208, 210, 212, 214, and up to 216. Any or all of the networking device 206 and the server devices 210-216 may be the IHS 100 discussed above with reference to FIG. 1 and/or may include some or all of the components of the IHS 100. In specific embodiments, the networking device 206 is a Top Of Rack (TOR) switch that couple the server devices 210-216 to other devices in and/or outside of a datacenter. However, the computing devices in the chassis 200 may be other types of networking devices, storage devices, and/or a variety of other datacenter computing device known in the art while remaining within the scope of the present disclosure. The networking device 206 includes a plurality of ports 206a that may include networking ports (e.g., Ethernet ports), management ports, communication ports, peripheral ports (e.g., Universal Serial Bus (USB) ports), and/or a variety of other ports known in the art that are configured to couple to the cabling subsystems as discussed below.

As illustrated in FIG. 2, a first subset of the ports 206a on the networking device 206 are coupled via a cabling subsystem 218 to ports 208a on the server device 208 that may include networking ports (e.g., Ethernet ports), management ports, communication ports, peripheral ports (e.g., Universal Serial Bus (USB) ports), and/or a variety of other ports known in the art. A second subset of the ports 206a on the networking device 206 are coupled via a cabling subsystem 220 to ports 210a on the server device 210 that may include networking ports (e.g., Ethernet ports), management ports, communication ports, peripheral ports (e.g., Universal Serial Bus (USB) ports), and/or a variety of other ports known in the art. A third subset of the ports 206a on the networking device 206 are coupled via a cabling subsystem 222 to ports 212a on the server device 212 that may include networking ports (e.g., Ethernet ports), management ports, communication ports, peripheral ports (e.g., Universal Serial Bus (USB) ports), and/or a variety of other ports known in the art. A fourth subset of the ports 206a on the networking device 206 are coupled via a cabling subsystem 224 to ports 214a on the server device 214 that may include networking ports (e.g., Ethernet ports), management ports, communication ports, peripheral ports (e.g., Universal Serial Bus (USB) ports), and/or a variety of other ports known in the art. A Nth subset of the ports 206a on the networking device 206 are coupled via a cabling subsystem 226 to ports 216a on the server device 216 that may include networking ports (e.g., Ethernet ports), management ports, communication ports, peripheral ports (e.g., Universal Serial Bus (USB) ports), and/or a variety of other ports known in the art. While each of the cabling subsystems 218-226 are illustrated as including a pair of cables (e.g., a cable connected on each of its ends to respective ports on the networking device 206 and one of the server devices is represented by a line extending between those ports), one of skill in the art in possession of the present disclosure will recognize that fewer or more cables may be provided in cabling subsystems between networking devices and server devices while remaining within the scope of the present disclosure. A plurality of cabling subsystems 228 that are coupled to one or more subsets of the ports 206a on the networking device 206 may also couple the networking device 206 to other devices (e.g., other networking devices in other racks, and/or other devices in the datacenter as discussed below)

In the illustrated embodiment, a cabling locator device 230 is located on the top wall 202a of the chassis 202, although the cabling locator device 230 may be located on any portion of the chassis 202 (or in the computing device housing 204) while remaining within the scope of the present disclosure. In an embodiment, the cabling locator device 230 may include a memory device for associating the cabling locator device 230 with the rack 200 (e.g., storing data that may include a rack identifier such as a rack number, rack location (e.g., a building identifier, a room identifier, a row identifier, a column identifier, an aisle identifier, etc.) and/or any other rack identifier information known in the art). The cabling locator device 230 may also include a processing system for enabling the functionality of the cabling locator device 230 discussed below, as well as a wireless communication device (e.g., a BLUETOOTH® communication device, a WiFi communication device, a ZIGBEE® communication device, and/or a variety of other wireless communication devices known in the art), a location determination device, and/or other subsystems that one of skill in the art in possession of the present disclosure would enable the functionality discussed below. In specific embodiments, the cabling locator device 230 may be an Internet of Things (IoT) device that provides a relatively small form factor device that may be associated with a datacenter entity and that may wirelessly communicate a variety of stored and determined information to one or more management systems. In an embodiment, the association of the cabling locator device 230 with the rack 200 may associate the cabling locator device 230 with each of the cabling subsystems 218-228 coupled to computing devices included in the rack 200, as discussed in further detail below.

In an embodiment, a cabling locator device 232 may be coupled to the networking device 206, and cabling locator devices 234, 236, 238, 240, and up to 242 may be coupled to respective server devices 208, 210, 212, 214, and up to 216. As an example of each of the cabling locator devices 232-242, the cabling locator device 236 may include a memory device for associating the cabling locator device 236 with the server device 210 (e.g., storing data that may include a server device identifier such as a server number, server location (e.g., building, room, row, column, aisle, rack, rack slot, etc.) and/or any other server device identifier information known in the art). The cabling locator device 236 may also include a processing system for enabling the functionality of the cabling locator device 236 discussed below, as well as a wireless communication device (e.g., a BLUETOOTH® communication device, a WiFi communication device, a ZIGBEE® communication device, and/or a variety of other wireless communication devices known in the art), a location determination device, and/or other subsystems that one of skill in the art in possession of the present disclosure would recognize would enable the functionality discussed below. In specific embodiments, the cabling locator device 236 may be an Internet of Things (IoT) device that provides a relatively small form factor device that may be associated with a datacenter entity and that may operate to wirelessly communicate a variety of stored and determined information to one or more management systems. In an embodiment, the association of the cabling locator device 236 with the server device 210 may associate the cabling locator device 236 with the cabling subsystem 220 that couples the server device 210 to the networking device 206, as discussed in further detail below. While only the cabling locator device 236 is described in detail above, one of skill in the art in possession of the present disclosure will recognize that the cabling locator devices 232, 234, 238, 240, and up to 242 may be substantially similar to the cabling locator device 236 discussed above while including the associations with their respective computing devices and providing the associated functionality discussed above.

In the embodiments illustrated in FIG. 2, the cabling locator device 230 is provided on and associated with the rack 200, the cabling locator device 232 is provided on and associated with the networking device 206, and the cabling locator devices 234-242 are provided on and associated with respective server devices 208-216 in order to associate those cabling locator devices with the cabling subsystems 218-226 as discussed above. However, more or fewer cabling locator devices may be provided with the rack and/or the computing devices in the rack 200 while remaining within the scope of the present disclosure. For example, some embodiment may only provide the cabling locator device 230 associated with the rack 200. In another example, some embodiments may provide the cabling locator devices 232-242 associated with any or all of the networking device 206 and server devices 208-216 without having the cabling locator device 230 associated with the rack 200. In yet other examples, some embodiments may provide cabling locator devices provided and associated with cabling subsystems, individual cables, cable connectors, ports on computing devices, and/or any feature in the rack 200 in order to associate those cabling locator devices with cabling subsystems to provide the functionality described below.

Figure 3:
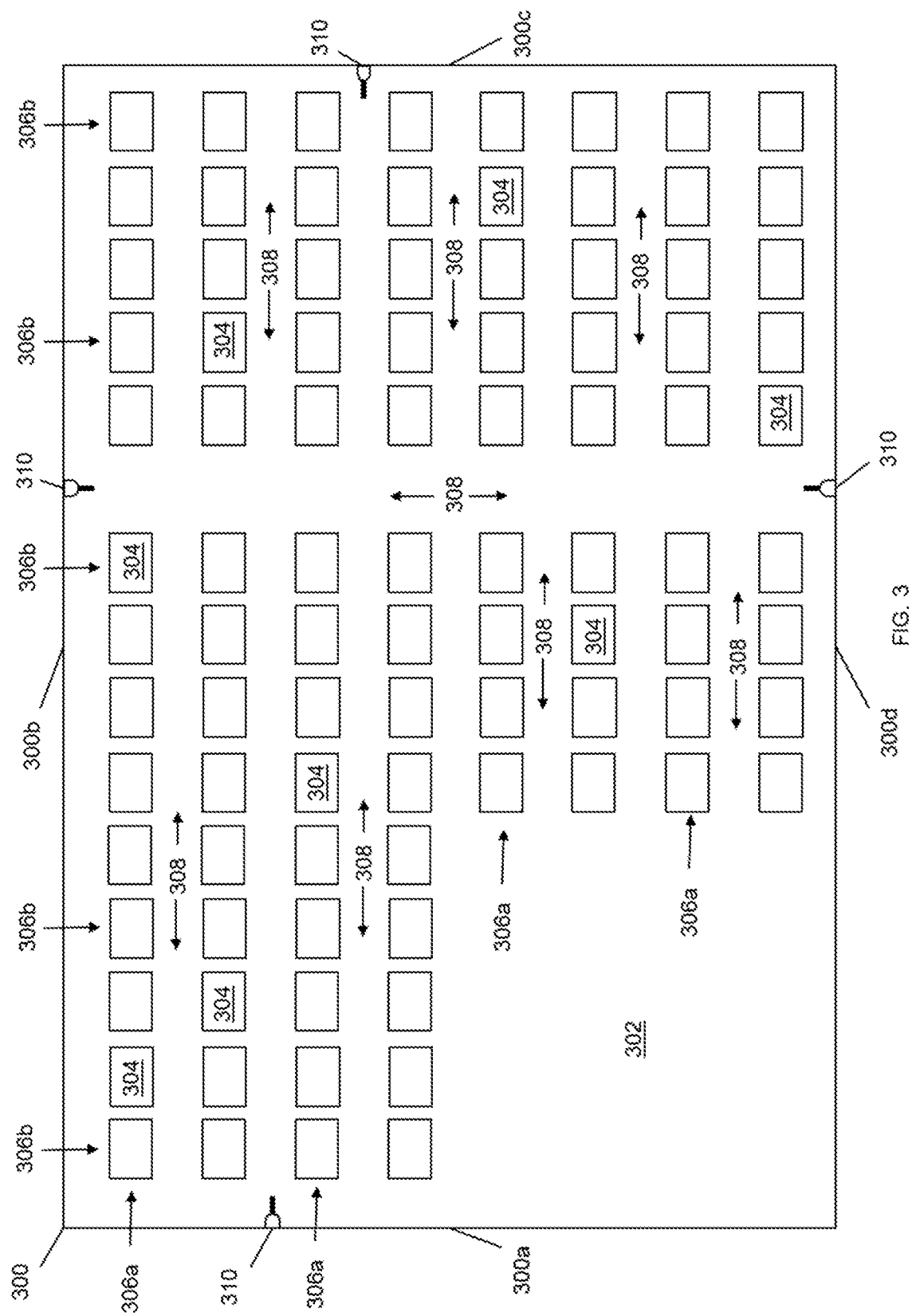
FIG. 3 is a schematic view illustrating an embodiment of a datacenter building including a plurality of the racks of FIG. 2.

Referring now to FIG. 3, an embodiment of a datacenter building 300 is illustrated. In the illustrated embodiment, the datacenter building 300 includes a plurality of walls 300a, 300b, 300c, and 300d (as well as a roof, floor, and other datacenter features that are not illustrated for clarity) that define a datacenter room 302 between them. While the datacenter building 300 is illustrated and defining a single datacenter room 302, one of skill in the art in possession of the present disclosure will recognize that the datacenter building 300 may include additional interior walls that define multiple rooms within the datacenter building 300 while remaining within the scope of the present disclosure. A plurality of racks 304 are included in the datacenter room 302 that may each be the rack 200 discussed above with reference to FIG. 2. In the illustrated embodiment, the plurality of racks 304 are provided in datacenter room 302 in a plurality of rows 306a and columns 306b such that a plurality of aisles 308 are defined between the rows 306a and columns 306b of racks 304. While a specific configuration of the racks 304 in the datacenter room 302 is illustrated and described below, one of skill in the art in possession of the present disclosure will recognize that a variety of other rack configurations will fall within the scope of the present disclosure. A plurality of wireless communication devices 310 are located at different locations in the datacenter room 302 (e.g., on the walls 300a-d) and configured to communicate with the cabling locator device(s) provided with each rack 200/304. For example, the wireless communication devices 310 may be router devices, access point devices, BLUETOOTH® communication devices, ZIGBEE® communication devices, and/or any other wireless communication device that may be configured to communicate with the cabling locator devices discussed above. While a plurality of wireless communication devices 310 are illustrated coupled to the walls 300a-d of the datacenter room 302, more or fewer wireless communication devices may be coupled to different locations in the datacenter room 302 (e.g., the ceiling, the floor, etc.) while remaining within the scope of the present disclosure.

Figure 4:
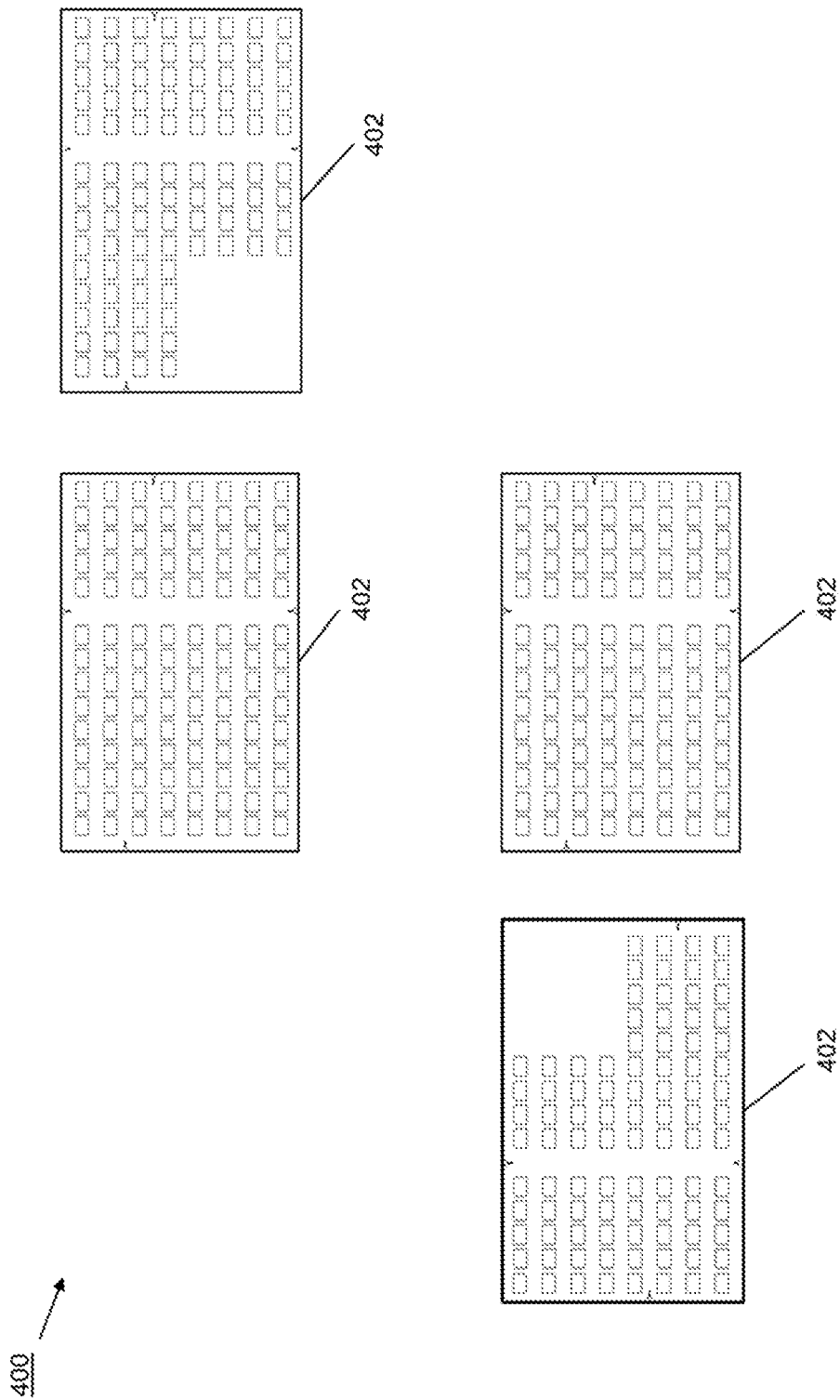
FIG. 4 is a schematic view illustrating an embodiment of a datacenter including a plurality of the datacenter buildings of FIG. 3.

Referring now to FIG. 4, an embodiment of a datacenter 400 is illustrated. In the illustrated embodiment, the datacenter 400 includes a plurality of datacenter buildings 402, each of which may be the datacenter building 300 discussed above with reference to FIG. 3, and/or datacenter buildings that are similar to the datacenter building 300. In addition, the datacenter buildings 402 may define areas between them that provide access to different areas of the datacenter 400, including roads, sidewalks, paths, and/or any other access area known in the art. While a specific example of a datacenter 400 is illustrated and described in FIG. 4, one of skill in the art in possession of the present disclosure will recognize that the datacenter 400 may include more or fewer datacenter buildings, more or fewer datacenter rooms, and/or any other datacenter features known in the art that, as discussed below, may be identified in datacenter maps/topologies and utilized to determine cabling issue locations and provide cabling issue directions as discussed below.

Figure 5:
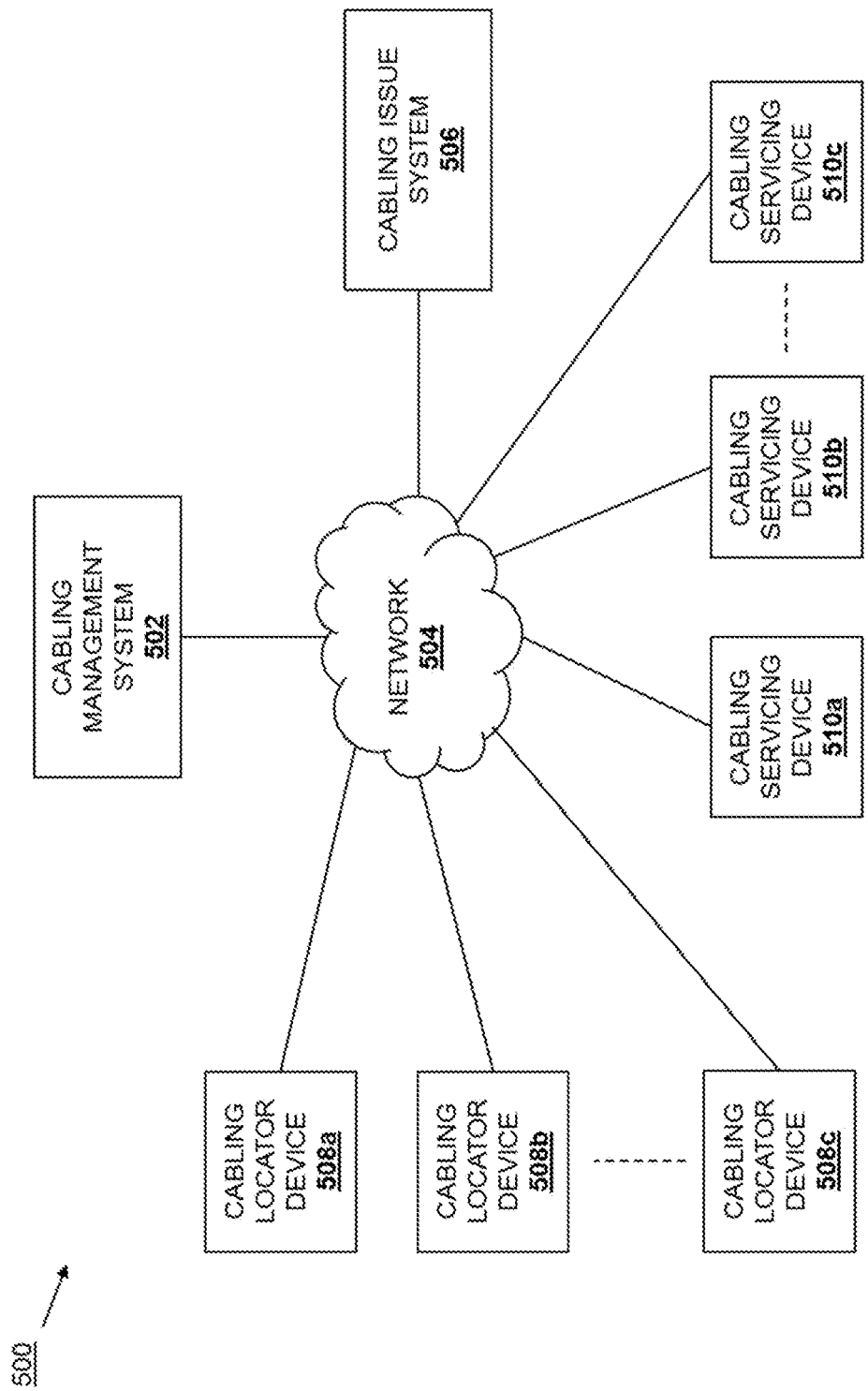
FIG. 5 is a schematic view illustrating an embodiment of a datacenter cabling servicing system.

Referring now to FIG. 5, an embodiment of a datacenter cabling servicing system 500 is illustrated. The datacenter cabling servicing system 500 includes a cabling management system 502 that may be the IHS 100 discussed above with reference to FIG. 1 and/or may include some or all of the components of the IHS 100. In a specific embodiment, the cabling management system 502 may be a desktop computing device, a laptop/notebook computing device, a tablet computing device, a mobile phone, and/or other computing devices known in the art. The cabling management system 502 is coupled through a network 504 to a cabling issue system 506. The cabling issue system 506 may be the IHS 100 discussed above with reference to FIG. 1 and/or may include some or all of the components of the IHS 100, as discussed below. In specific embodiments, the cabling issue system 506 includes one or more subsystems for receiving reports of the cabling issues, providing information about those cabling issues to the cabling management system 502 through the network, and/or performing any of the other functionality discussed below.

The cabling management system 502 is also coupled through the network 504 to a plurality of cabling locator devices 508a, 508b, and up to 508c, each of which may be any of the cabling locator devices 230-242 discussed above with reference to FIG. 2, as well as any other cabling locator devices described herein. The cabling management system 502 is also coupled through the network 504 to a plurality of cabling servicing devices 510a, 510b, and up to 510c. Each of the cabling servicing devices 510a-c may be the IHS 100 discussed above with reference to FIG. 1 and/or may include some or all of the components of the IHS 100. In specific example, the cabling servicing devices 510a, 510b, and/or 510c may include mobile computing devices such as, for example, laptop/notebook computing devices, tablet computing devices, mobile phones, and/or any other mobile computing devices known in the art. As discussed below, the cabling servicing devices 510a-c may be configured to determine and report their locations to the cabling management system 502 through the network 504. In some embodiments, the cabling servicing devices 510a-c may be Internet of Things (IoT) devices that provides a relatively small form factor device that may be associated with an entity (e.g., the cabling servicing technicians discussed below) and that may operate to wirelessly communicate a variety of stored and determined information to one or more management systems. In some examples, the cabling servicing devices 510a-c may be provided in cabling technician badges and associated with the cabling technicians that are provided those badges. For example, such badges may include a memory device for associating that cabling servicing device with a cabling technician (e.g., storing data that may include a cabling technician identifier such as an employee number, employee name, employee skill set, etc.) and/or any other cabling technician identifier information known in the art.

The cabling servicing device may also include a processing system for enabling the functionality of the cabling servicing devices discussed below, as well as a wireless communication device (e.g., a BLUETOOTH® communication device, a WiFi communication device, a ZIGBEE® communication device, and/or a variety of other wireless communication devices known in the art), a location determination device, and/or other subsystems that one of skill in the art in possession of the present disclosure would recognize would enable the functionality discussed below. As such, in some embodiments, the cabling servicing devices 510a-c may include only mobile computing devices, only IoT badges, and combinations of mobile computing devices and IoT badges that provide the functionality discussed below.

Figure 6:
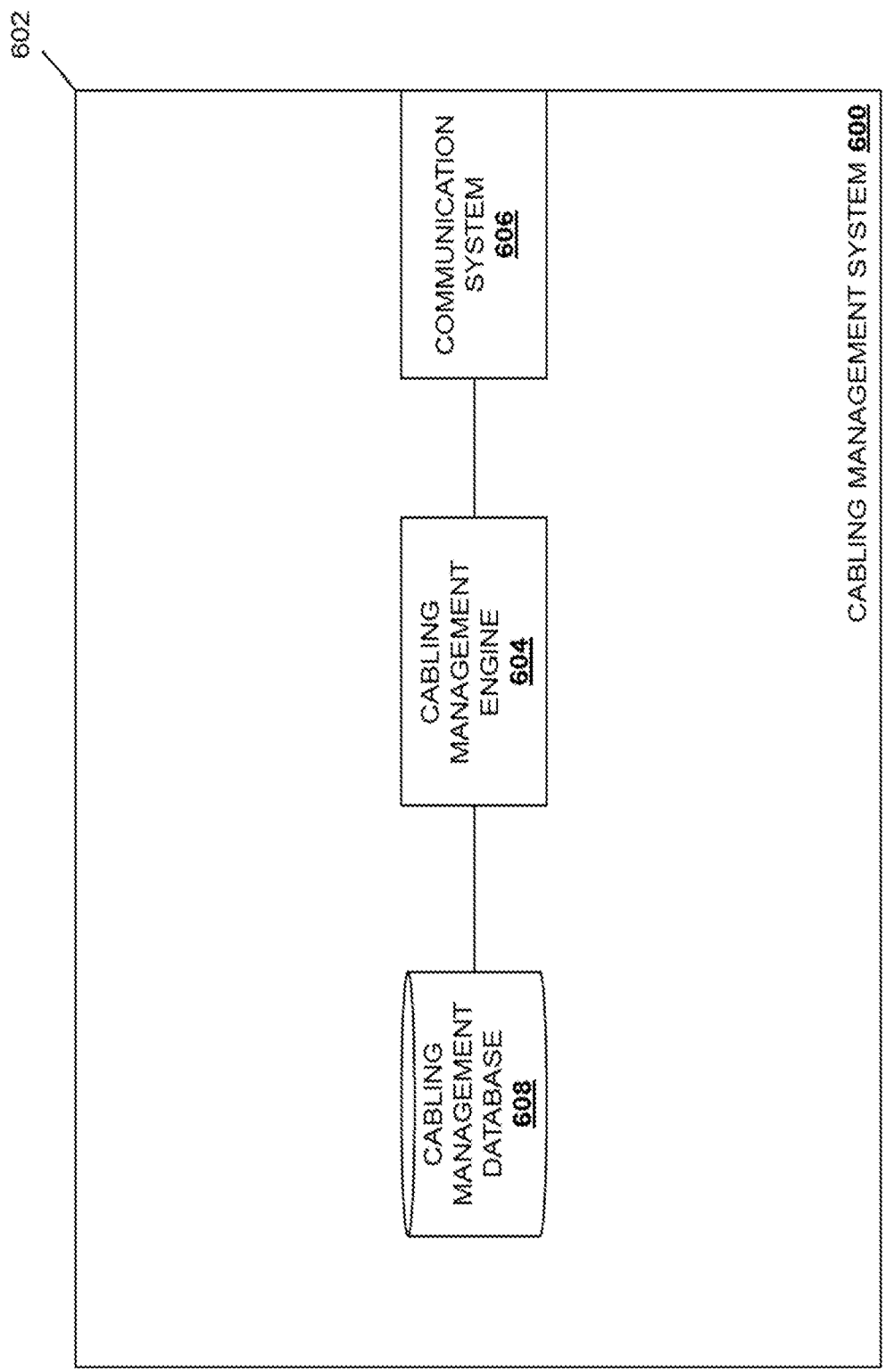
FIG. 6 is a schematic view illustrating an embodiment of a cabling management system used in the datacenter cabling servicing system of FIG. 5.

Referring now to FIG. 6, an embodiment of a cabling management system 600 is illustrated that may be the cabling management system 602 discussed above with reference to FIG. 5. As such, the cabling management system 600 may be the IHS 100 discussed above with reference to FIG. 1 and/or may include some or all of the components of the IHS 100, and in specific embodiments may include a desktop computing device, a laptop/notebook computing device, a tablet computing device, a mobile phone, and/or other computing devices known in the art. The cabling management system 600 includes a chassis 602 that houses the components of the cabling management system 600, only some of which are illustrated in FIG. 6. For example, in the illustrated embodiment, the chassis 602 may house a processing system (not illustrated, but which may include the processor 102 discussed above with reference to FIG. 2) and a memory system (not illustrated, but which may include the memory system 118 discussed above with reference to FIG. 1) that includes instructions that, when executed by the processing system, cause the processing system to provide a cabling management engine 604 that is configured to perform the functions of the cabling management engines and cabling managements systems discussed below.

The chassis 602 may also house a communication system 606 that is coupled to the cabling management engine 604 (e.g., via a coupling between the processing system and the communication system 606) and that may include a Network Interface Controller (NIC), a wireless communication device, and/or a variety of other communication systems known in the art. The chassis 602 may also house a storage system (not illustrated, but which may include the storage device 108 discussed above with reference to FIG. 1) that includes a cabling management database 608 that may house the information such as, for example, associations between cabling locator devices and cabling subsystems, associations between cabling servicing devices and cabling technicians, datacenter maps/topologies, and/or any other information utilized by the cabling management engine 604 as discussed below. While a specific example of a cabling management system 600 has been illustrated and described, one of skill in the art in possession of the present disclosure will recognize that the cabling management system 600 may include a variety of other components for providing the functionality discussed below, as well as conventional components for performing conventional functions, while remaining within the scope of the present disclosure.

Figure 7:
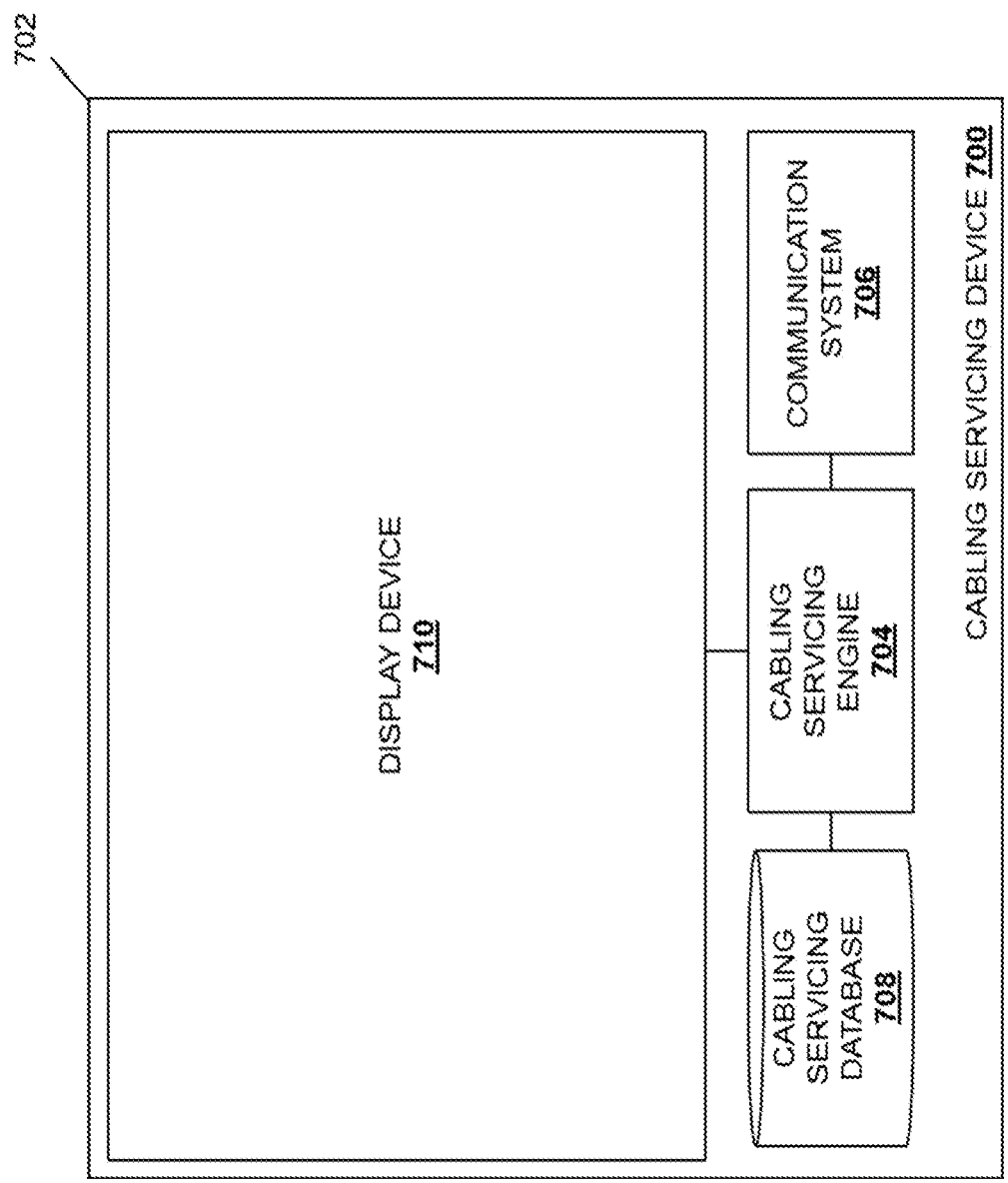
FIG. 7 is a schematic view illustrating an embodiment of a cabling servicing device used in the datacenter cabling servicing system of FIG. 5.

Referring now to FIG. 7, an embodiment of a cabling servicing device 700 is illustrated that may be the cabling servicing devices 510a-c discussed above with reference to FIG. 5. As such, the cabling servicing device 700 may be the IHS 100 discussed above with reference to FIG. 1 and/or may include some or all of the components of the IHS 100, and in specific embodiments may include mobile computing devices such as, for example, laptop/notebook computing devices, tablet computing devices, mobile phones, and/or any other mobile computing devices known in the art. The cabling servicing device 700 includes a chassis 702 that houses the components of the cabling servicing device 700, only some of which are illustrated in FIG. 7. For example, in the illustrated embodiment, the chassis 702 may house a processing system (not illustrated, but which may include the processor 102 discussed above with reference to FIG. 2) and a memory system (not illustrated, but which may include the memory system 118 discussed above with reference to FIG. 1) that includes instructions that, when executed by the processing system, cause the processing system to provide a cabling servicing engine 704 that is configured to perform the functions of the cabling servicing engines and cabling servicing devices discussed below.

The chassis 702 may also house a communication system 706 that is coupled to the cabling servicing engine 704 (e.g., via a coupling between the processing system and the communication system 706) and that may include a wireless communication device and/or a variety of other communication systems known in the art. The chassis 702 may also house a storage system (not illustrated, but which may include the storage device 108 discussed above with reference to FIG. 1) that includes a cabling servicing database 708 that may house the information such as, for example, associations between the cabling servicing device and cabling technician, datacenter maps/topologies, and/or any other information utilized by the cabling servicing engine 704 as discussed below. The chassis 702 may also house a display device 710 that is coupled to the cabling servicing engine 704 (e.g., via a coupling between the processing system and the display device 710) and that may be the display 110 discussed above with reference to FIG. 1. While a specific example of a cabling servicing device 700 has been illustrated and described, one of skill in the art in possession of the present disclosure will recognize that the cabling servicing device 700 may include a variety of other components for providing the functionality discussed below, as well as conventional components for performing conventional functions, while remaining within the scope of the present disclosure.

Figure 8:
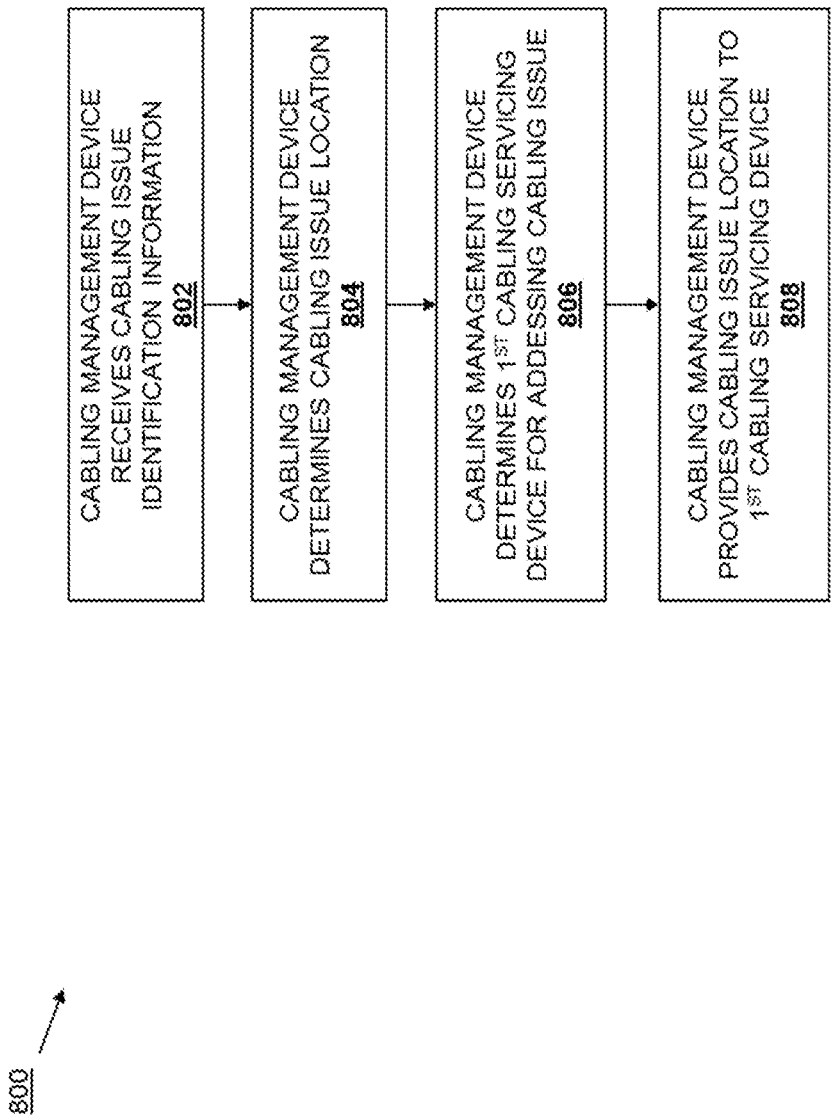
FIG. 8 is a flow chart illustrating an embodiment of a method for servicing cabling in a datacenter.

Referring now to FIG. 8, an embodiment of a method 800 for servicing cabling issues in a datacenter is illustrated. As discussed below, embodiments of the systems and methods of the present disclosure provide Internet of Things (IoT) devices in a datacenter in association with cabling subsystems and cabling technicians, and combine information received from those IoT devices with information received by a cabling issue system in order to dispatch the servicing of cabling issues to cabling technicians in a manner that is more efficient than is possible in conventional systems. As such, the systems and methods provide substantial improvements in the operation and costs associated with servicing cabling in a datacenter, while also realizing improvements in datacenter mapping, cabling technician staffing, and other benefits that will be apparent to one of skill in the art in possession of the present disclosure.

The method 800 begins at block 802 where a cabling management device receives cabling issue identification information. In an embodiment, the cabling issue system 506 is configured to receive reports of cabling issues from users, administrators, and/or other entities related to the datacenter, create cabling "tickets" or other identifications of cabling work that needs to be performed by cabling technicians in the datacenter, and provide those cabling tickets to the cabling management system 502. For example, a cabling ticket may be produced in response to a new computing device and/or new rack being added to the datacenter, which is associated with a need to provide cabling between the new computing device(s) in that new rack and existing computing devices in existing racks in the datacenter. In response, the cabling issue system 506 may generate cabling issue identification information that may include a new or modified datacenter map/topology that details how cabling should be provided between the new computing device(s) and existing computing devices in the datacenter, and provide that cabling issue identification information at block 802 through the network 504 to the cabling management system 502/600 (which is received by the cabling management engine 604 through the network 504 via the communication system 606). With reference to FIG. 2, cabling issue identification information in this specific example may include identification of the rack 200, the computing devices 206-216, each of the cabling subsystems 218-226 and their associated connections, and/or any other information necessary to connect the rack 200 to the rest of the datacenter as desired. As such, cabling issue identification information received by the cabling management system 502 may include information provided by any entity related to the datacenter that details at least one cabling subsystem that is to be provided between new computing devices that are added to the datacenter and existing computing devices in the datacenter.

In another example, a cabling ticket may be produced in response to a computing device (e.g., a server device, a switch device, one or more ports on one or more computing devices in a rack, etc.) and/or a cabling subsystem in the datacenter "going down", failing, and/or otherwise becoming unavailable, which may be associated with a need to check, replace, and/or modify the cabling subsystem between a particular computing device and other computing devices in the datacenter. In response, the cabling issue system 506 may generate cabling issue identification information that may include an identification of the computing device that has become unavailable, a request to check the computing device (and/or ports on the computing device, other computing devices coupled to the unavailable computing device, failed cabling subsystem(s) coupled to the unavailable computing device, etc.), and/or instructions to replace cabling subsystem(s) coupled to the computing device (e.g., when the issue with the cabling subsystem and/or computing device can be determined remotely). At block 802 the cabling issue system 506 may provide that cabling issue identification information through the network 504 to the cabling management system 502/600 (which is received by the cabling management engine 604 through the network 504 via the communication system 606). With reference to FIG. 2, cabling issue identification information in this specific example may include identification of any of the computing devices 206-216, any of the cabling subsystems 218-226 and their associated connections to ports on the computing devices 206-216, and/or any other information identifying an unavailable computing device in the datacenter. As such, cabling issue identification information received by the cabling management system 502 may include information provided by any entity related to the datacenter that details at least one cabling subsystem that is to be checked, confirmed, and/or otherwise analyzed to determine the cause of an unavailable computing device in the datacenter.

In another example, a cabling ticket may be produced in response to a need to add communication capacity to a computing device (e.g., a server device, a switch device, one or more ports one or more computing devices in a rack, etc.) in the datacenter, which may be associated with a need to add cabling subsystem(s) between that computing device and other computing devices (e.g., by adding cabling subsystem(s) between a switch and that computing device) in order to increase the bandwidth available between those computing devices. In response, the cabling issue system 506 may generate cabling issue identification information that may include an identification of the computing device that needs additional bandwidth, an identification of at least one other computing device that may be coupled (via cabling subsystem(s)) to that computing device to provide the additional bandwidth, and an identification of cabling subsystem(s) that may be utilized to provide the additional bandwidth for the computing device (e.g., a cable length, a cable type, etc.). At block 802 the cabling issue system 506 may provide that cabling issue identification information through the network 504 to the cabling management system 502/600 (which is received by the cabling management engine 604 through the network 504 via the communication system 606). With reference to FIG. 2, cabling issue identification information in this specific example may include identification of the computing device 206 and any of the computing devices 208-216, additional cabling subsystems (similar to the cabling subsystems 218-226) and the associated connections (i.e., between ports on the computing devices 206-216) necessary to provide the additional bandwidth needed, and/or any of information necessary to provide additional bandwidth as desired. As such, cabling issue identification information received by the cabling management system 502 may include information provided by any entity related to the datacenter that details at least one cabling subsystem that is to be provided between a plurality of computing devices to provide additional bandwidth in the datacenter.

While a few specific examples of cabling issue identification information have been provided, one of skill in the art in possession of the present disclosure will recognize that any cabling issue known in the art that is associated with a cabling subsystem may be identified by the cabling issue system 506 and provided as cabling issue identification information to the cabling management system 502 while remaining within the scope of the present disclosure. In addition, while the cabling management system 502 and the cabling issue system 506 are illustrated and described as separate, the cabling management system 502 and cabling issue system 506 may be combined and provided in one or more computing devices while remaining within the scope of the present disclosure. Furthermore, other datacenter information may be utilized in determining the cabling issue identification information and/or provided as part of the cabling issue identification information. For example, datacenter maps, topologies, and/or other datacenter/computing device spatial relationship data may be stored in the cabling issue system 506 and/or the cabling management database 608 and used to provide the cabling issue identification information (e.g., a datacenter map/topology may be utilized to determine a cabling length that will be required to provide cabling subsystem(s) between any computing devices in the datacenter). Further still, rather than specific identification of cabling issues to the cabling issue system 506 (e.g., users or administrator providing a report of a specific cabling issue), modifications to a datacenter map/topology (e.g., by a datacenter administrator) may cause cabling issue identification information to be automatically generated by the cabling issue system 506 and provided to the cabling management system 502. For example, a datacenter administrator may provide an instruction or details to the cabling issue system 506 about a change in a datacenter map or cabling topology (e.g., to add a rack, increase bandwidth to one or more computing devices, or otherwise detail some change to the datacenter that would result in the addition, removal, and/or modification of cabling subsystems in the datacenter) and, in response, the cabling issue system 506 may then automatically determine, generate, and send the cabling issue identification information that describes that change to the datacenter map/cabling topology and provide it to the cabling management system 502. Thus, while specific embodiments of cabling issue identification information are illustrated and described herein, a wide variety of modification is envisioned as falling within the scope of the present disclosure.

The method 800 then proceeds to block 804 where the cabling management device determines a cabling issue location. In an embodiment, the cabling management engine 604 in the cabling management system 502/600 may utilize the cabling issue identification information received through the network 504 at block 802, and cabling locator device locations received from the cabling locator devices 508a-508c, in order to determine a cabling issue location. For example, as discussed above, any or all of the cabling locator devices 508a-508c (e.g., the cabling locator devices 230-242 and/or similar cabling locator devices throughout the datacenter) may periodically report respective cabling locator device locations to the cabling management system 502 through the network 504 (e.g., as determined by location determination subsystems in the cabling locator devices and provided via the wireless communication devices 310 and/or other communication subsystems in the datacenter that communication through the network 504). The cabling management engine 604 in the cabling management system 502/600 may receive the cabling locator device locations from the cabling locator devices in the datacenter and store those cabling locator device locations in the cabling management database 608. At block 104, the cabling issue identification information received at block 102 allows the cabling management engine 604 to determine a cabling issue location associated with a cabling issue in the datacenter by comparing the identified cabling subsystem(s) in the cabling issue identification information to one or more cabling locator device locations in the cabling management database 608 to determine a location in the datacenter that corresponds to those identified cabling subsystem(s).

For example, using the embodiment of cabling issue identification information that involves the addition of computing device(s) to the datacenter, the cabling issue identification information may identify existing rack(s) and/or existing computing device(s) in the datacenter to which cabling subsystem(s) must be connected in order to add new computing device(s) to the datacenter. The locations of those existing rack(s) and/or existing computing device(s) may be associated with cabling locator devices that have provided cabling locator device locations stored in the cabling management database 608 (e.g., cabling locator device(s) similar to the cabling locator device 230 illustrated in FIG. 2 may provide cabling locator device location(s) for each existing rack in the datacenter; cabling locator device(s) similar to the cabling locator device(s) 206-216 may provide cabling locator device location(s) for each existing computing device in the datacenter; etc.), and thus the identification of existing rack(s) and/or computing device(s) in the cabling issue identification information allows a cabling issue location to be determined based on the cabling locator device locations that are received and stored in the cabling management database 608 and associated with cabling locator devices provided with those existing racks(s) and/or computing device(s).

Similarly, using the embodiment of cabling issue identification information that involves the unavailability of computing device(s) in the datacenter, the cabling issue identification information may identify existing rack(s) and/or existing computing device(s) in the datacenter which are unavailable and to which cabling subsystem(s) are connected, and the locations of those existing rack(s) and/or existing computing device(s) may be associated with cabling locator devices that have provided cabling locator device locations stored in the cabling management database 608 (e.g., cabling locator device(s) similar to the cabling locator device 230 illustrated in FIG. 2 may provide cabling locator device location(s) for each existing rack in the datacenter; cabling locator device(s) similar to the cabling locator device(s) 206-216 may provide cabling locator device location(s) for each existing computing device in the datacenter; etc.), and thus the identification of existing rack(s) and/or computing device(s) in the cabling issue identification information allows a cabling issue location to be determined based on the cabling locator device locations that are received and stored in the cabling management database 608 and associated with cabling locator devices provided with those existing rack(s) and/or computing device(s).

Similarly, using the embodiment of cabling issue identification information that involves the request to provide additional communication capacity to computing device(s) in the datacenter, the cabling issue identification information may identify existing rack(s) and/or existing computing device(s) in the datacenter which require additional bandwidth and to which cabling subsystem(s) are connected, and the locations of those existing rack(s) and/or existing computing device(s) may be associated with cabling locator devices that have provided cabling locator device locations stored in the cabling management database 608 (e.g., cabling locator device(s) similar to the cabling locator device 230 illustrated in FIG. 2 may provide cabling locator device location(s) for each existing rack in the datacenter; cabling locator device(s) similar to the cabling locator device(s) 206-216 may provide cabling locator device location(s) for each existing computing device in the datacenter; etc.), and thus the identification of existing rack(s) and/or computing device(s) in the cabling issue identification information allows a cabling issue location to be determined based on the cabling locator device locations that are received and stored in the cabling management database 608 and associated with cabling locator devices provided with those existing rack(s) and/or computing device(s).

In addition to identifying the cabling issue locations associated with a reported cabling issue as discussed above, the cabling locator device locations received from the cabling locator devices may be utilized to provide other benefits in the datacenter. In an embodiment, the cabling management engine 604 may monitor the cabling locator devices locations stored in the cabling management database 608 to track the locations of associated rack(s), computing device(s), and/or cabling subsystems to monitor the datacenter for changes. For example, as discussed above, the cabling management system 600 may store a datacenter map/topology, a datacenter cabling topology, and/or other information that describes the spatial relationships between racks, computing devices, and cabling subsystems in the datacenter in the cabling management database 608. In some embodiments, the cabling management engine 604 may periodically check the cabling locator device locations (which are associated with the locations of the racks, computing devices, and cabling subsystems in the datacenter) against the datacenter map/topology to determine differences between the two and, if such differences are detected, provide a datacenter topology notification through the network 504 to the cabling issue system 506 and/or other datacenter administrator device. As such, the movement of rack(s), computing device(s), cabling subsystem(s), and/or any other elements of the datacenter may be monitored, and a notification provided to a datacenter administer if the new location of any element is different from a datacenter map/topology stored in or provided to the cabling management database 608. As such, datacenter changes may be monitored and flagged, and in some cases used to update datacenter maps/topologies in real-time as the datacenter changes occur. One of skill in the art in possession of the present disclosure will appreciate that the relatively small size of the cabling locator devices allows them to be provided with any element that is to be location-tracked in order to enable various levels of the datacenter topology tracking discussed above.

The method 800 then proceeds to block 806 where the cabling management device determines a first cabling servicing device for addressing the cabling issue associated with the cabling issue identification information received at block 802. In an embodiment, at any particular time, the cabling management engine 604 in the cabling management system 502/600 may receive current locations through the network 504 from the cabling servicing devices 510a-510c. For example, as discussed above, the cabling servicing devices 510a-510c may be provided to each cabling technician in the datacenter, and any or all of the cabling servicing devices 510a-510c may periodically (or continuously) report respective current locations to the cabling management system 502 through the network 504 (e.g., via the wireless communication devices 310 and/or other communication subsystems (e.g., WiFi communications systems) that may be provided to enable communication through the network 504). The cabling management engine 604 in the cabling management system 502/600 may receive the current locations from the cabling servicing devices in the datacenter and store those current locations in the cabling management database 608. Thus, at block 104, the current locations of the cabling servicing devices 510a-510c received at block 806 provides the cabling management engine 604 with the locations of each of the cabling servicing devices 510a-510c in the datacenter. As discussed above, the cabling servicing devices may be mobile computing devices such as phones, tablet computing devices, etc. (e.g., as illustrated and discussed herein with respect to the cabling servicing device 700). However, in other embodiments, the cabling servicing devices may include a location beacon device (e.g., as provided by an IoT device included in a cabling servicing technician card, tag, or other wearable or carriable element that is provided to each cabling service technician in the datacenter) that is configured to provide the current location discussed above.

Figure 9:
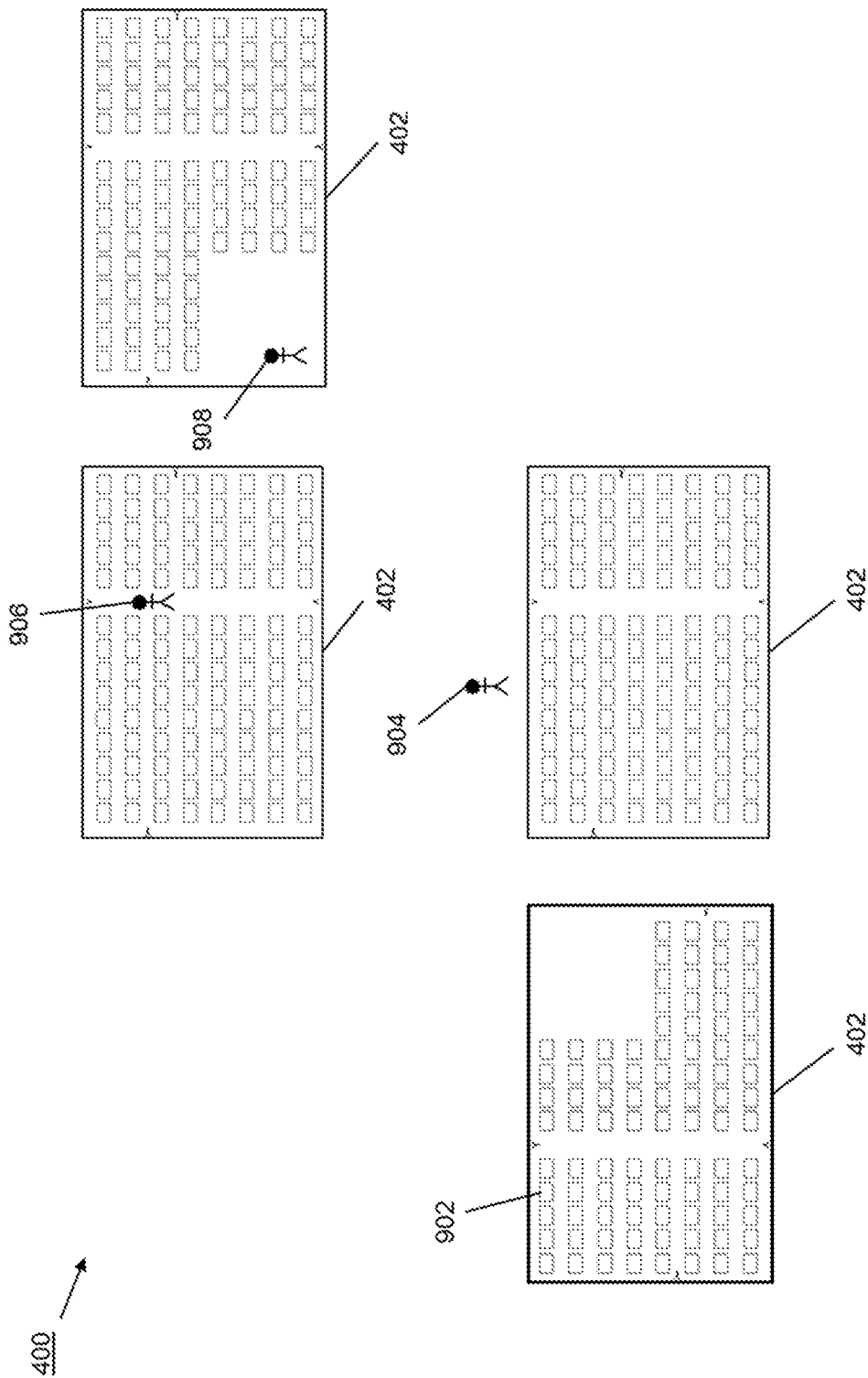
FIG. 9 is a schematic view illustrating an embodiment of the datacenter of FIG. 4 with the locations of a plurality of cabling servicing devices and a cabling issue identified.

With reference to FIG. 9, the schematic embodiment of the datacenter 400 is illustrated that includes the cabling issue location 902 that is determined at block 804 from the cabling issue identification information received at block 802, and the current locations 904, 906, and 908 received at block 806. In the specific embodiment illustrated in FIG. 9, the cabling issue location 900 illustrates that the cabling issue associated with the cabling issue identification information is located in a particular rack provided in a particular row, column and/or aisle of a particular building 402 in the datacenter 400, while the current locations 904, 906, and 908 of the cabling servicing devices (and their associated cabling technicians) are located outside the buildings 402 in the datacenter 400 (e.g., as is the case with the current location 904), in a particular aisle of a building 402 in the datacenter 400 (e.g., as is the case with the current location 906), and in a particular building 402 of the datacenter 400 (e.g., as is the case with the current location 908). One of skill in the art in possession of the present disclosure will recognize that the method 800 may be performed such that many more cabling issue locations and current locations of cabling servicing devices may be identified in a datacenter at any particular time while remaining within the scope of the present disclosure. Furthermore, the granularity of the cabling issue locations and current locations may be greater (i.e., providing more accurate locations than those illustrated in FIG. 9) or less (i.e., providing less accurate locations than those illustrated in FIG. 9) that is specifically illustrated] while still providing the benefits described herein, and thus various levels of location accuracy are envisioned as falling within the scope of the present disclosure.

In an embodiment of block 806, the cabling management engine 604 may determine a cabling servicing device, from one of the plurality of cabling servicing devices that are associated with the current locations received at block 806, that should address the cabling issue associated with the cabling issue location determined at block 804. For example, with reference to FIG. 9, the cabling management engine 604 may determine that the cabling servicing device associated with the current location 904 should address the cabling issue associated with the cabling issue location 902 due, at least in part, to the current location 904 being closest to the cabling issue location 902 when compared to the others of the current locations 906 and 908. One of skill in the art in possession of the present disclosure will recognize that the distance between a cabling issue location and the current location of a cabling service device may be determined based on a point-to-point (e.g., straight line) distance, based on one or more known available paths between the cabling issue location and current location (e.g., a path through datacenter available to a cabling servicing technician), and/or in a variety of other manners while remaining within the scope of the present disclosure. Furthermore, many other factors may be considered when determining which of a plurality of cabling servicing devices (associated with current locations received at block 806) should be dispatched, requested, or otherwise instructed to address the cabling issue associated with the cabling issue location 902, just a few of which are described below.

In some embodiments, the cabling servicing devices may be configured to report the cabling management engine 604 a status of their associated cabling technician to indicate to the cabling management engine 604 when that cabling servicing technician will be available to address a cabling issue. For example, a cabling technician may provide information to their cabling servicing device that indicates that they are currently addressing a cabling issue, the amount of time they expect will be required to address a cabling issue they are currently dealing with, availability to address subsequent cabling issues, and/or any other information that may be utilized in determining the availability of that cabling technician to address the cabling issue associated with the cabling issue location 902. Furthermore, rather than receiving reports of such information from the cabling technicians through their cabling servicing devices, the cabling management engine 604 may be configured to determine such information based on previously sent cabling issue dispatches, current locations received from the cabling servicing devices, and/or any other information generated by the system. For example, the cabling management engine 604 may have previously sent a cabling issue dispatch to the cabling servicing device associated with the current location 906, and that cabling issue dispatch may be associating with a first cabling issue (e.g., the installation of a new rack in the datacenter) that is known to require some amount of time (e.g., 2 hours). Based on determining that the current location 906 of the cabling servicing device corresponded to a first cabling issue location for the first cabling issue that the cabling servicing device reached at a first time, the cabling servicing technician associated with that cabling servicing device may be determined to be "busy" (i.e., unavailable to address subsequent cabling issues) for the time required to address the first cabling issue.

In addition, such determinations of the availability of cabling servicing technicians may take into account the availability of all cabling servicing technicians (which may be determined similarly as discussed above). As such, cabling issue dispatches may be "scheduled" based on cabling servicing device (and associated cabling servicing technician) proximity to the cabling issue location, as well as cabling service technician availability based on the cabling issues that are currently being addressed by that cabling servicing technician. In addition, a cabling technician scheduling database that is accessible to the cabling management engine 604 and that details the work schedules of cabling technicians (e.g., work start times, work stop times, work break times, etc.) may be utilized by the cabling management engine 604 in order to determine whether to provide a cabling issue dispatch to a cabling technician via their cabling servicing device. For example, when a cabling servicing technician schedule indicates that the cabling servicing technician may have a scheduled work break or may be ending work relatively soon, that cabling servicing technician may not be considered for addressing a cabling issue (particularly when that cabling issue is known to require a time that may extend into that work break or past the end their work schedule). Similarly, when a cabling servicing technician schedule indicates that the cabling servicing technician may be finishing a scheduled work break or may about to otherwise begin work relatively soon, that cabling servicing technician may be considered for addressing a cabling issue (i.e., even when that cabling technician is not currently working).

As discussed above, while proximity, availability based on in-process addressing of cabling issues, and cabling servicing technician scheduling have been explicitly described as being utilized in determining a cabling servicing technician/cabling servicing device for addressing the cabling issue at the cabling issue location 902, one of skill in the art in possession of the present disclosure will recognize a variety of other information may be considered when determining a cabling servicing technician/cabling servicing device for addressing the cabling issue. For example, cabling servicing technician ability (e.g., training to address particular cabling issues, equipment availability to address particular cabling issues, etc.) may be reported and/or associated with the cabling servicing device that will allow the cabling management engine 604 to determine whether a particular cabling servicing device at a current location is associated with a cabling servicing technician that is able to address the cabling issue at the cabling issue location 902. As such, any of a variety of information for determining which of the plurality of cabling servicing technician/cabling servicing device in the datacenter should address the cabling issue is envisioned as falling within the scope of the present disclosure.

The method 800 then proceeds to block 808 where the cabling management device provides the cabling issue location to the first cabling servicing device. In an embodiment, at block 808, the cabling management engine 604 in the cabling management system 502/600 may provide the cabling issue location (as well as a variety of other information) through the network 504 to the cabling servicing device determined at block 806. While specific examples of the provisioning of the cabling issue location to the cabling servicing device are illustrated and described below, the present disclosure is not envisioned as being limited to only those particular embodiments, and one of skill in the art will recognize that a wide variety of variation, combination, and modification to the examples of cabling issue information provisioning on the cabling servicing device will fall within the scope of the present disclosure.

Figure 10:
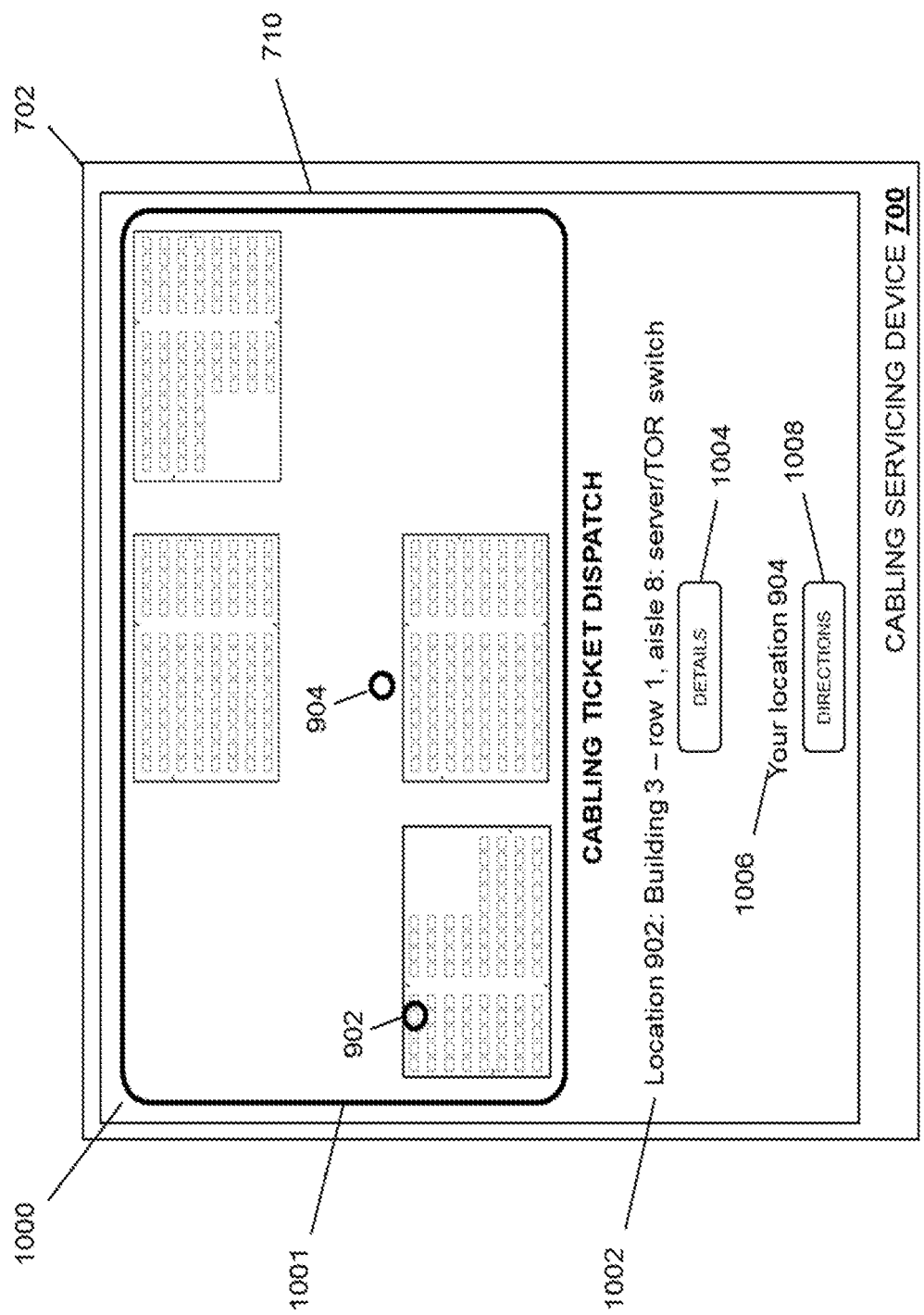
FIG. 10 is a schematic view illustrating the cabling servicing device of FIG. 7 providing a cabling issue notification.

Referring now to FIG. 10, an embodiment of the cabling servicing device 700 (i.e., the cabling servicing device determined at block 806) is illustrated displaying a graphical user interface 1000 that provides a cabling issue notification. For example, the cabling servicing engine 704 in the cabling servicing device 700 may receive the cabling issue location through the network 504 from the cabling management system 502, and utilize a datacenter map/topology (e.g., received from the cabling management system 502 and/or stored in the cabling servicing database 708) in order to render and provide the graphical user interface 1000 for display on the display device 710. In the illustrated embodiment, the cabling issuing notification provided on the graphical user interface 1000 includes a graphical datacenter topology 1001 that provides a graphical map that displays the datacenter including the buildings and datacenter rooms discussed above. In particular, the graphical datacenter topology 1001 is displaying the relative location of the cabling issue location 902 in the datacenter, and the relative location of the current location 904 in the datacenter. The graphical datacenter topology 1001 also includes cabling issue location information 1002 that provides information about the cabling issue location 902 including, in the illustrated embodiment, a building number (e.g., "building 3"), a rack row and aisle (e.g., "row 1, aisle 8"), and a computing device description (e.g., "server/TOR switch"). Furthermore, the graphical datacenter topology 1001 also includes a details element 1004 that the cabling servicing technician may select to retrieve further details about the cabling issue location 902, which may include any details about the cabling issue that may not be efficient to display on the graphical datacenter topology 1001 (e.g., port numbers, cabling information, etc.) Further still, the graphical datacenter topology 1001 includes current location information 1006 that identifies to the cabling servicing technician that the current location 904 of the cabling servicing device 700 is provided on the graphical datacenter topology 1001, as well as a directions element 1008 that the cabling servicing technician may select to retrieve directions from the current location 904 to the cabling issue location 902, an example of which is illustrated and discussed below.

Figure 11:
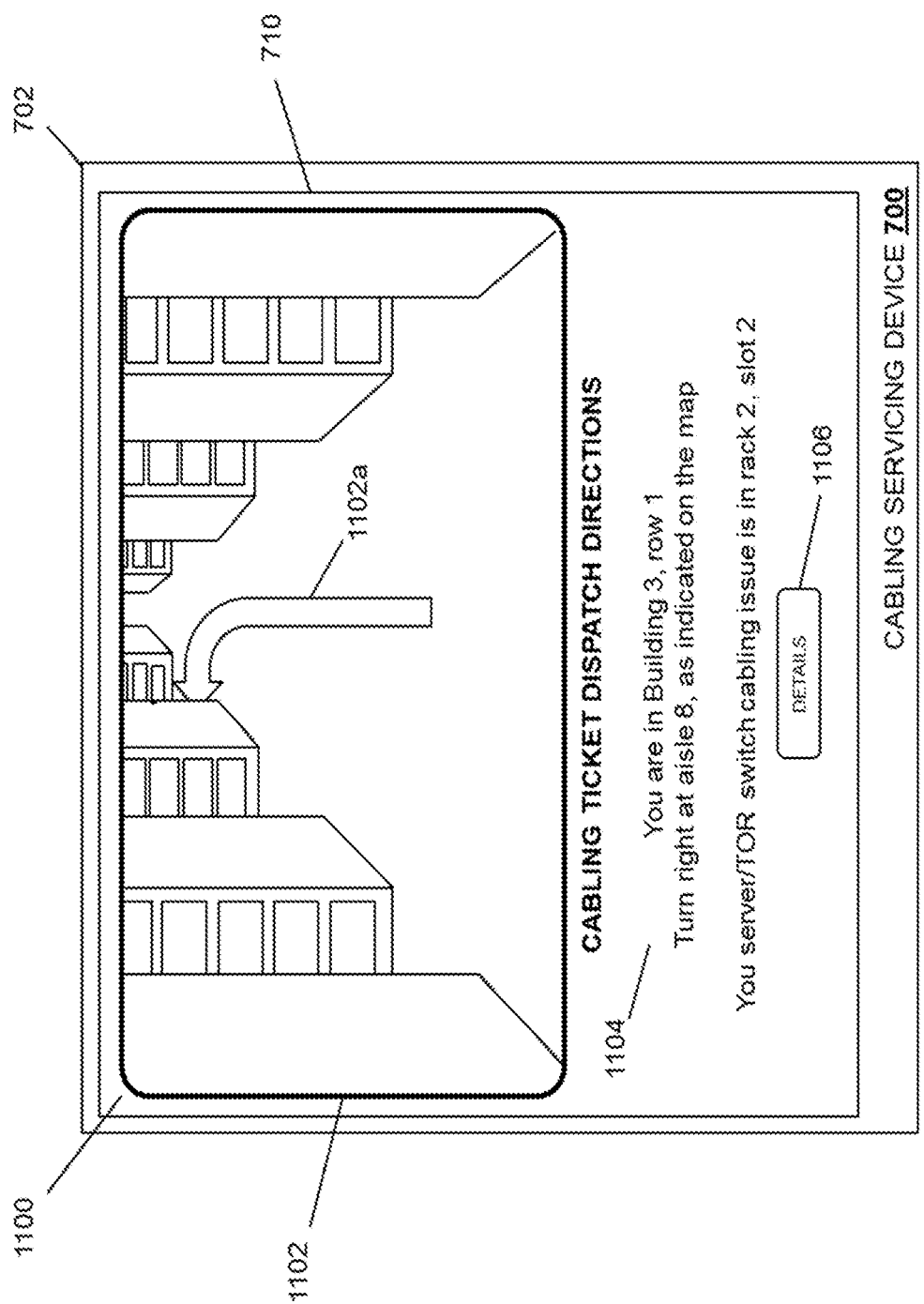
FIG. 11 is a schematic view illustrating the cabling servicing device of FIG. 7 providing cabling issue directions.

Referring now to FIG. 11, an embodiment of the cabling servicing device 700 (i.e., the cabling servicing device determined at block 806) is illustrated displaying a graphical user interface 1100 that provides cabling issue directions. For example, the cabling servicing engine 704 in the cabling servicing device 700 may receive an instruction from the cabling servicing technician (e.g., via a selection of the directions element 1008 discussed above) and utilize the cabling issue location, currently determined location(s) of the cabling servicing device 700, and the datacenter map/topology (including information for providing the "first person" views discussed below), in order to render and provide the graphical user interface 1100 for display on the display device 710. In the illustrated embodiment, the cabling issuing directions provided on the graphical user interface 1100 include a graphical first person view 1102 that may provide a graphical, real-time, dynamic first-person view that displays the current location 902 of the cabling servicing device 700 in the datacenter while continuously updated as the cabling servicing device 700 moves through the datacenter. In particular, the graphical first person view 1102 in FIG. 11 is displaying the first person view of the cabling servicing device 700 at a point in time as the cabling servicing device 700 is moving from the current location 904 to the cabling issue location 902, and includes a directions element 1102a that indicates to the cabling servicing technician the directions to take through the datacenter to reach the cabling issue location 902. One of skill in the art in possession of the present disclosure will recognize how direction elements similar to the direction element 1102a may be continuously determined and updated based on the cabling issue location 902 and the changing current location 904 of the cabling servicing device 700 in order to provide "turn-by-turn" direction from the current location 904 of the cabling servicing device 700 to the cabling issue location 902 in the datacenter. The graphical first person view 1102 also includes cabling issue location information 1104 that provides information about the cabling issue location 902 including, in the illustrated embodiment, information about a building and row that the cabling servicing device is currently located in (e.g., "building 3"), directions to turn on a particular aisle (e.g., "aisle 8"), and a computing device location (e.g., "rack 2, slot 2"). Furthermore, the graphical first person view 1102 also includes a details element 1106 that the cabling servicing technician may select to retrieve further details about the cabling issue location 902, which may include any details about the cabling issue that may not be efficient to display on the graphical first person view 1102 (e.g., port numbers, cabling information, etc.)

Referring now to FIG. 12, an embodiment of the cabling servicing device 700 (i.e., the cabling servicing device determined at block 806) is illustrated displaying a graphical user interface 1200 that provides cabling issue details. For example, the cabling servicing engine 704 in the cabling servicing device 700 may receive a current location (e.g., corresponding to the cabling issue location 902) or an instruction from the cabling servicing technician (e.g., via a selection of the details element 1106 discussed above) and utilize the cabling issue location, currently determined locations of the cabling servicing device 700, and the datacenter map/topology (including information for providing the rack views discussed below), in order to render the graphical user interface 1200 and provide it for display on the display device 710. In the illustrated embodiment, the cabling issuing details provided on the graphical user interface 1200 include a graphical rack view 1202 that provides a graphical rack/computing device/cabling subsystem topology that displays a front (or rear) view of the rack in which a cabling issue has been reported. In particular, the graphical rack view 1202 is displaying the rack with each of the computing devices in that rack visible along with their associated cabling subsystems, and includes a cabling issue element 1202a that indicates to the cabling servicing technician the cabling subsystem (i.e., the cabling subsystem 222 illustrated in FIG. 2) for which the cabling issue has been reported, along with a suggested repair. One of skill in the art in possession of the present disclosure will recognize how cabling issue elements similar to the cabling issue element 1202a may be provided for a variety of cabling issues other than the "link down" issue in the illustrated embodiment, and thus may include more detailed cabling issue diagrams and/or suggested methods for addressing the cabling issue (e.g., particularly with respect to connecting a rack full of computing devices to the datacenter).

As such, one of skill in the art in possession of the present disclosure will recognize that any of a variety of graphical user interfaces may be rendered on the cabling servicing device 700 in order to provide a variety of directions to the cabling issue location, as well as directions to identify the cabling subsystems associated with the issue, and provide instructions that will allow for the addressing of the cabling issue. Furthermore, while the level of detail provided in the graphical user interfaces illustrated and discussed above is believed to be helpful in directing a cabling servicing technician to the cabling issue location, higher levels of detail and/or lower levels of details may be utilized depending on the complexity of the datacenter, the cabling issue, and/or other details that may effect the addressing of the cabling issue.

One of skill in the art in possession of the present disclosure will recognize that a variety of benefits may result from the use of the systems and methods of the present disclosure. For example, one particular benefit that results from the use of the cabling service device current locations and the availability information associated with the cabling servicing technicians is the ability to provide for the addressing of cabling issues "out-of-order", or otherwise in a different order from which they were received, in order to provide efficiencies not available with conventional cabling servicing systems that address reported cabling issues in a first-reported, first addressed manner. For example, a first cabling issue may be reported prior to a second cabling issue. In the event a cabling servicing device is determined to be closer to the cabling issue location for the second cabling issue, that cabling servicing device may be instructed to address the second cabling issue (which in this example is closer to that cabling servicing device by, for example, being in the same building of the datacenter) rather than the first cabling issue that was reported prior to the second cabling issue (but which may be further away from that cabling servicing device by, for example, being located several buildings away in the datacenter). As such, the cabling servicing technician may address that second cabling issue prior to traveling to the cabling issue location of the first cabling issue, providing for a more efficient addressing of the cabling issues in the datacenter, and allowing for the dispatching of cabling servicing technicians to cabling servicing issues in a manner that uses those cabling servicing technician resources efficiently while providing greater datacenter "uptime" than is possible in conventional cabling servicing systems.

Thus, systems and methods have been described that provide for the determination of the physical location of a cabling issue in a datacenter, along with the tracking of the current locations of cabling servicing devices (and their associated cabling servicing technicians) throughout the datacenter, in order to allow for the determination of the most efficient cabling servicing technicians to dispatch to address the cabling issue. The systems and methods of the present disclosure address the inefficiencies associated with the random allocation of cabling issues to cabling servicing technicians, and relieve those cabling servicing technicians from the need to manually determine the location of a cabling issue in a datacenter using physical maps, and physical identifiers on the racks, computing devices, and cabling subsystems in the datacenter. As such, human errors that result from the manual processes conventionally used to address cabling issues are eliminated, while simplifying the identification of cabling issues for cabling servicing technicians, and providing for efficient allocation of cabling issues to cabling servicing technicians that takes into account a global view of cabling servicing technician/cabling issue proximity, cabling service technician availability, and cabling servicing technician scheduling.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A datacenter cabling servicing system, comprising:
   a plurality of computing devices;
   a plurality of cabling subsystems interconnecting the plurality of computing devices;
   a plurality of cabling locator devices, wherein each of the plurality of cabling locator devices is associated with at least one of the plurality of cabling subsystems;
   a plurality of cabling servicing devices;
   a cabling issue system that is coupled to the plurality of cabling subsystems, the plurality of computing devices, and the plurality of cabling locator devices, wherein the cabling issue system is configured to:
      detect that a first cabling subsystem that is included in the plurality of cabling subsystems is no longer available based on an availability of a first computing device that is included in the plurality of computing devices and that is coupled to the first cabling subsystem and, in response, generate and send cabling issue identification information that identifies the first cabling subsystem as being unavailable; and
   a cabling management system that is coupled through a network to the plurality of cabling locator devices, the plurality of cabling servicing devices; and the cabling issue system, wherein the cabling management system is configured to:
      receive the cabling issue identification information through the network from the cabling issue system;
      determine a cabling issue location of the first cabling subsystem using the cabling issue identification information and a first cabling locator device location received through the network from a first cabling locator device of the plurality of cabling locator devices that is associated with the first cabling subsystem;
      receive a current location through the network from each of the plurality of cabling servicing devices;
      determine a respective distance between the cabling issue location and the current location of each of the plurality of cabling servicing devices based on one or more known available paths between the cabling issue location and the current location of each of the plurality of cabling servicing devices;

determine that a first cabling servicing device of the plurality of cabling servicing devices, which is located at a first current location that is closest to the cabling issue location relative to the respective current location of each of the other plurality of cabling servicing devices based on the respective distances determined between the cabling issue location and the current location of each of the plurality of cabling servicing devices, is associated with an unavailable cable servicing technician based on cabling servicing technician availability information;

determine that a second cabling service device of the plurality of cabling servicing devices, which is located at a second current location that is the second closest to the cabling issue location, is associated with an available cable servicing technician based on the cabling servicing technician availability information; and provide the cabling issue location of the first cabling subsystem through the network for display on the second cabling servicing device.

2. The datacenter cabling servicing system of claim 1, wherein the cabling management system is configured to:
provide a plurality of direction messages through the network for display on the second cabling servicing device, wherein the plurality of direction messages provide directions between the second current location of the second cabling servicing device and the cabling issue location of the first cabling subsystem.

3. The datacenter cabling servicing system of claim 1, wherein the cabling issue system is configured to:
receive an instruction to change a datacenter cabling topology and, in response, generate and send the cabling issue identification information that describes the change in the datacenter cabling topology through the network to the cabling management system.

4. The datacenter cabling servicing system of claim 1, wherein the cabling management system is configured to:
receive a datacenter cabling topology through the network from the cabling issue system; and
determine a difference between the datacenter cabling topology and the cabling locator device locations received through the network from each of the plurality of cabling locator devices that are each associated with at least one of the plurality of cabling subsystems and, in response, send a datacenter cabling topology notification through the network to the cabling issue system.

5. The datacenter cabling servicing system of claim 1, wherein the cabling issue identification information is first cabling issue identification information received by the cabling management system from the cabling issue system at a first time, and the cabling issue location is a first cabling issue location determined using the first cabling issue identification information, and wherein the cabling management system is configured to:
receive second cabling issue identification information through the network from the cabling issue system prior to receiving the first cabling issue information, wherein the second cabling issue identification information identifies a cabling issue with a second cabling subsystem of the plurality of cabling subsystems;
determine a second cabling issue location of the second cabling subsystem using the second cable issue identification information and a second cabling locator device location received through the network from a second cabling locator device of the plurality of cabling locator devices that is associated with the second cabling subsystem; and
determine that the second current location of the second cabling servicing device is closer to the first cabling issue location than the second cabling issue location and, in response, provide the first cabling issue location through the network for display on the second cabling servicing device prior to providing the second cabling issue location through the network for display on the second cabling servicing device.

6. The datacenter cabling servicing system of claim 1, wherein the cabling management system is configured to:
provide a graphical user interface through the network for display on the second cabling servicing device that includes the cabling issue location via a rendering of the first cabling subsystem and at least one computing device coupled to the first cabling subsystem.

7. An information handling system (IHS), comprising:
a communication system;
a processing system; and
a memory system that is coupled to the processing system and that includes instructions that, when executed by the processing system, cause the processing system to provide a cabling management engine that is configured to:
receive cabling issue identification information through the communication system from a cabling issue system, wherein the cabling issue identification information identifies a cabling issue with a first cabling subsystem of a plurality of cabling subsystems in a datacenter, and wherein the cabinet issue indicates:
that the first cabling subsystem lacks a bandwidth to provide a communication capacity for a first computing device that is coupled to the first cabling subsystem; and
a second computing device for coupling to the first computing device using a second cabling subsystem in order to satisfy the bandwidth to provide the communication capacity for the first computing device;
determine a first cabling issue location of the first computing device using the cabling issue identification information and a first cabling locator device location received through the communication system from a first cabling locator device, of a plurality of cabling locator devices in the datacenter, that is associated with the first cabling subsystem;
determine a second cabling issue location of the second computing device using the cabling issue identification information and a second cabling locator device location received through the communication system from a second cabling locator device that is associated with the second computing device;
receive a current location through the communication system from each of a plurality of cabling servicing devices;
determine a respective distance between the first cabling issue location, the second cabling issue location, and the current location of each of the plurality of cabling servicing devices based on one or more known available paths between the first cabling issue location, the second cabling issue location, and the current location of each of the plurality of cabling servicing devices;

determine that a first cabling servicing device of the plurality of cabling servicing devices, which is located at a first current location that is closest to the first cabling issue location and the second cabling issue location relative to the respective current location of each of the other plurality of cabling servicing devices based on the respective distances determined between the first cabling issue location, the second cabling issue location, and the current location of each of the plurality of cabling servicing devices, is associated with an unavailable cable servicing technician based on cabling servicing technician availability information;

determine that a second cabling service device of the plurality of cabling servicing devices, which is located at a second current location that is the second closest to the first cabling issue location and the second cabling issue location, is associated with an available cable servicing technician based on the cabling servicing technician availability information; and provide the cabling issue location of the first cabling subsystem through the communication system for display on the second cabling servicing device.

8. The IHS of claim 7, wherein the cabling management engine is configured to:

provide a plurality of direction messages through the communication system for display on the second cabling servicing device, wherein the plurality of direction messages provide directions between a second current location of the second cabling servicing device and the cabling issue location of the first cabling subsystem.

9. The IHS of claim 7, wherein the cabling management engine is configured to:

receive a datacenter cabling topology through the communication system from the cabling issue system; and determine a difference between the datacenter cabling topology and respective cabling locator device locations received through the communication system from each of the plurality of cabling locator devices that are each associated with at least one of the plurality of cabling subsystems and, in response, send a datacenter cabling topology notification through the communication system to the cabling issue system.

10. The IHS of claim 7, wherein the cabling issue identification information is first cabling issue identification information received by the cabling management engine from the cabling issue system at a first time and wherein the cabling management engine is configured to:

receive second cabling issue identification information through the communication system from the cabling issue system prior to receiving the first cabling issue information, wherein the second cabling issue identification information identifies a cabling issue with a third cabling subsystem of the plurality of cabling subsystems;

determine a third cabling issue location of the third cabling subsystem using the second cable issue identification information and a third cabling locator device location received through the communication system from a third cabling locator device, of the plurality of cabling locator devices, that is associated with the third cabling subsystem; and determine that the second current location of the second cabling servicing device is closer to the first cabling issue location or the second cabling issue location than the third cabling issue location and, in response, provide the first cabling issue location through the communication system for display on the second cabling servicing device prior to providing the third cabling issue location through the communication system for display on the second cabling servicing device.

11. The IHS of claim 7, wherein the cabling management engine is configured to:

provide a graphical user interface through the communication system for display on the second cabling servicing device that includes the first cabling issue location and the second cabling issue location via a rendering of the first cabling subsystem and at least one computing device coupled to the first cabling subsystem.

12. The IHS of claim 7, wherein second cabling servicing device includes a mobile computing device that is configured to display the first cabling issue location and the second cabling issue location, and a separate location beacon device that is configured to provide the second current location of the second cabling servicing device.

13. A method for servicing cabling issues in a datacenter, comprising:

receiving, by a cabling management device through a network from a cabling issue system, cabling issue identification information that identifies a cabling issue with a first cabling subsystem of a plurality of cabling subsystems in a datacenter, wherein the cabling issue with the first cabling subsystem includes adding the first cabling subsystem to the datacenter between a new computing device and an existing computing device in response to detecting an addition of the new computing device to the datacenter;

determining, by the cabling management device, a cabling issue location of the first cabling subsystem using the cabling issue identification information and a first cabling locator device location received through the network from a first cabling locator device, of a plurality of cabling locator devices in the datacenter, that is associated with the existing computing device;

receiving, by the cabling management device through the network from each of a plurality of cabling servicing devices, a current location;

determine a respective distance between the cabling issue location and the current location of each of the plurality of cabling service devices based on one or more known available paths between the cabling issue location and the current location of each of the plurality of cabling servicing devices;

determining, by the cabling management device, that a first cabling servicing device of the plurality of cabling servicing devices, which is located at a first current location that is closest to the cabling issue location relative to the respective current location of each of the other plurality of cabling servicing devices based on the respective distances determined between the cabling issue location and the current location of each of the plurality of cabling servicing devices, is associated with an unavailable cable servicing technician based on cabling servicing technician availability information;

determining, by the cabling management device, that a second cabling service device of the plurality of cabling servicing devices, which is located at a second current location that is the second closest to the cabling issue location, is associated with an available cable servicing technician based on the cabling servicing technician availability information; and providing, by the cabling management device through the network for display on the second cabling servicing device, the cabling issue location of the first cabling subsystem.

14. The method of claim 13, further comprising:
providing, by the cabling management device through the network for display on the second cabling servicing device, a plurality of direction messages that provide directions between the current location of the second cabling servicing device and the cabling issue location of the first cabling subsystem.

15. The method of claim 13, further comprising:
receiving, by the cabling management device through the network from the cabling issue system, a datacenter cabling topology; and
determining by the cabling management device, a difference between the datacenter cabling topology and respective cabling locator device locations received through the network from each of the plurality of cabling locator devices that are each associated with at least one of the plurality of cabling subsystems and, in response, sending a datacenter cabling topology notification through the network to the cabling issue system.

16. The method of claim 13, wherein the cabling issue identification information is first cabling issue identification information received by the cabling management device from the cabling issue system at a first time, and the cabling issue location is a first cabling issue location determined using the first cabling issue identification information, and wherein the method further comprises:
receiving, by the cabling management device through the network from the cabling issue system, second cabling issue identification information prior to receiving the first cabling issue information, wherein the second cabling issue identification information identifies a cabling issue with a second cabling subsystem of the plurality of cabling subsystems;
determining, by the cable management device, a second cabling issue location of the second cabling subsystem using the second cable issue identification information and a second cabling locator device location received through the network from a second cabling locator device, of the plurality of cabling locator devices, that is associated with the second cabling subsystem; and
determining, by the cable management device, that the current location of the second cabling servicing device is closer to the first cabling issue location than the second cabling issue location and, in response, providing the first cabling issue location through the network for display on the second cabling servicing device prior to providing the second cabling issue location through the network for display on the second cabling servicing device.

17. The method of claim 13, further comprising:
providing, by the cabling management device through the network for display on the second cabling servicing device, a graphical user interface that includes the cabling issue location via a rendering of the first cabling subsystem and at least one computing device coupled to the first cabling subsystem.

18. The method of claim 13, wherein second cabling servicing device includes a mobile computing device that is configured to display the cabling issue location, and a separate location beacon device that is configured to provide the current location of the first cabling servicing device.

* * * * *